United States Patent
Liu et al.

(10) Patent No.: US 9,762,324 B2
(45) Date of Patent: Sep. 12, 2017

(54) CHANNEL MAPPING FOR AN AGGREGATED TOUCHLESS WIRELESS FRONTHAUL

(71) Applicant: Futurewei Technologies, Inc., Plano, TX (US)

(72) Inventors: Xiang Liu, Marlboro, NJ (US); Frank Effenberger, Colts Neck, NJ (US); Lei Zhou, Shenzhen (CN); Huafeng Lin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/921,021

(22) Filed: Oct. 23, 2015

(65) Prior Publication Data

US 2016/0128085 A1    May 5, 2016

Related U.S. Application Data

(60) Provisional application No. 62/073,773, filed on Oct. 31, 2014.

(51) Int. Cl.
*H04B 10/00*     (2013.01)
*H04B 10/2575*   (2013.01)
(Continued)

(52) U.S. Cl.
CPC ......... *H04B 10/2575* (2013.01); *H04J 14/00* (2013.01); *H04L 27/2697* (2013.01);
(Continued)

(58) Field of Classification Search
CPC ............ H04B 10/2575; H04L 27/2697; H04L 27/34; H04L 5/0044; H04J 14/00; H04W 72/00; H04W 28/065
See application file for complete search history.

(56) References Cited

U.S. PATENT DOCUMENTS

| | | | | |
|---|---|---|---|---|
| 5,949,796 A | * | 9/1999 | Kumar | .................. H04H 20/22 370/487 |
| 2009/0004984 A1 | * | 1/2009 | Chrabieh | ............. H04L 5/0044 455/205 |

(Continued)

FOREIGN PATENT DOCUMENTS

| KR | 101347295 B1 | 1/2014 |
|---|---|---|
| WO | 2010121417 A1 | 10/2010 |

OTHER PUBLICATIONS

Foreign Communication From a Counterpart Application, PCT Application No. PCT/CN2015/093093, English Translation of International Search Report dated Feb. 14, 2016, 7 pages.

(Continued)

*Primary Examiner* — Danny Leung
(74) *Attorney, Agent, or Firm* — Conley Rose, P.C.

(57) ABSTRACT

A method implemented by a wireless fronthaul unit, the method comprises aggregating a plurality of first wireless channel signals to produce a first aggregated signal via digital frequency-domain mapping (FDM), wherein the first wireless channel signals are positioned in the first aggregated signal in non-overlapping first frequency bands, each non-overlapping first frequency band having a first bandwidth and a center frequency, wherein each respective center frequency is an odd integer multiple of a lowest center frequency, converting the first aggregated signal into a first modulated signal, and transmitting the first modulated signal to a wireless fronthaul link.

19 Claims, 16 Drawing Sheets

(51) Int. Cl.
  *H04J 14/00* (2006.01)
  *H04L 27/26* (2006.01)
  *H04W 28/06* (2009.01)
  *H04W 72/00* (2009.01)
  *H04L 5/00* (2006.01)
  *H04L 27/34* (2006.01)
(52) U.S. Cl.
  CPC ............ *H04L 5/0044* (2013.01); *H04L 27/34* (2013.01); *H04W 28/065* (2013.01); *H04W 72/00* (2013.01)

(56) References Cited

U.S. PATENT DOCUMENTS

| | | | | |
|---|---|---|---|---|
| 2009/0103483 | A1* | 4/2009 | Higuchi | H04L 5/0005 370/329 |
| 2011/0317647 | A1* | 12/2011 | Cho | H04L 5/0007 370/329 |
| 2012/0039293 | A1* | 2/2012 | Feng | H04L 5/001 370/329 |
| 2013/0077582 | A1* | 3/2013 | Kim | H04W 74/006 370/329 |
| 2013/0176952 | A1* | 7/2013 | Shin | H04L 5/001 370/329 |
| 2014/0016604 | A1* | 1/2014 | Lee | H04L 5/001 370/329 |
| 2014/0286277 | A1* | 9/2014 | Jang | H04L 5/0048 370/329 |
| 2015/0146644 | A1* | 5/2015 | Kim | H04L 5/0048 370/329 |
| 2015/0365934 | A1* | 12/2015 | Liu | H04L 5/0039 370/329 |
| 2016/0128085 | A1* | 5/2016 | Liu | H04J 14/00 398/96 |
| 2016/0212747 | A1* | 7/2016 | Effenberger | H04W 72/0453 |
| 2017/0078024 | A1* | 3/2017 | Liu | H04J 1/02 |

OTHER PUBLICATIONS

Foreign Communication From a Counterpart Application, PCT Application No. PCT/CN2015/093093, English Translation of Written Opinion dated Feb. 19, 2016, 4 pages.

Liu, et al., "A Novel Multi-Service Small-Cell Cloud Radio Access Network for Mobile Backhaul and Computing Based on Radio-Over-Fiber Technologies," Journal of Lightwave Technology, vol. 31, No. 17, Sep. 1, 2013, pp. 2869-2875.

"Common Public Radio Interface (CPRI); Interface Specification," CPRI Specification V4.1, Feb. 18, 2009, 109 pages.

Liu, et al., "Efficient Mobile Fronthaul Transmission of Multiple LTE—A Signals with 36.86-Gb/s CPRI-Equivalent Data Rate Using a Directly-Modulated Laser and Fiber Dispersion Mitigation," The Optical Society, Optical Society of America, Paper AF4B.5, Asia Communications and Photonics Conference 2014, Shanghai, China, Nov. 11, 2014, 3 pages.

"Nyquist-Shannon Sampling Theorem," Wikipedia, Downloaded from the Internet Oct. 30, 2014; 11 pages.

Liu, et al., "Aggregated Touchless Wireless Fronthaul," U.S. Appl. No. 14/528,823, filed Oct. 30, 2014, 74 pages.

Andre, et al., "Analytical Formulation for SNR Prediction in DMDD OFDM-Based Access Systems," IEEE Photonics Technology Letters, vol. 26, No. 12, Jun. 15, 2014, pp. 1255-1258.

Wei, "Small-Signal Analysis of OOFDM Signal Transmission with Directly Modulated Laser and Direct Detection," Optics Letters, vol. 36, No. 2, Jan. 15, 2011, pp. 151-153.

* cited by examiner

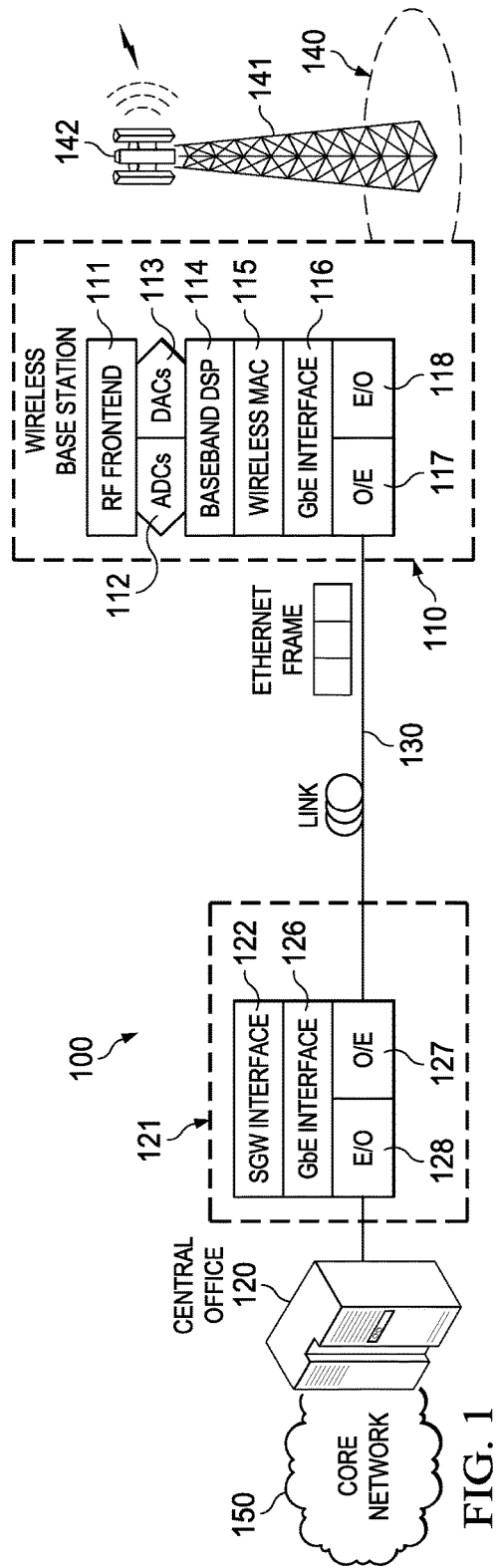
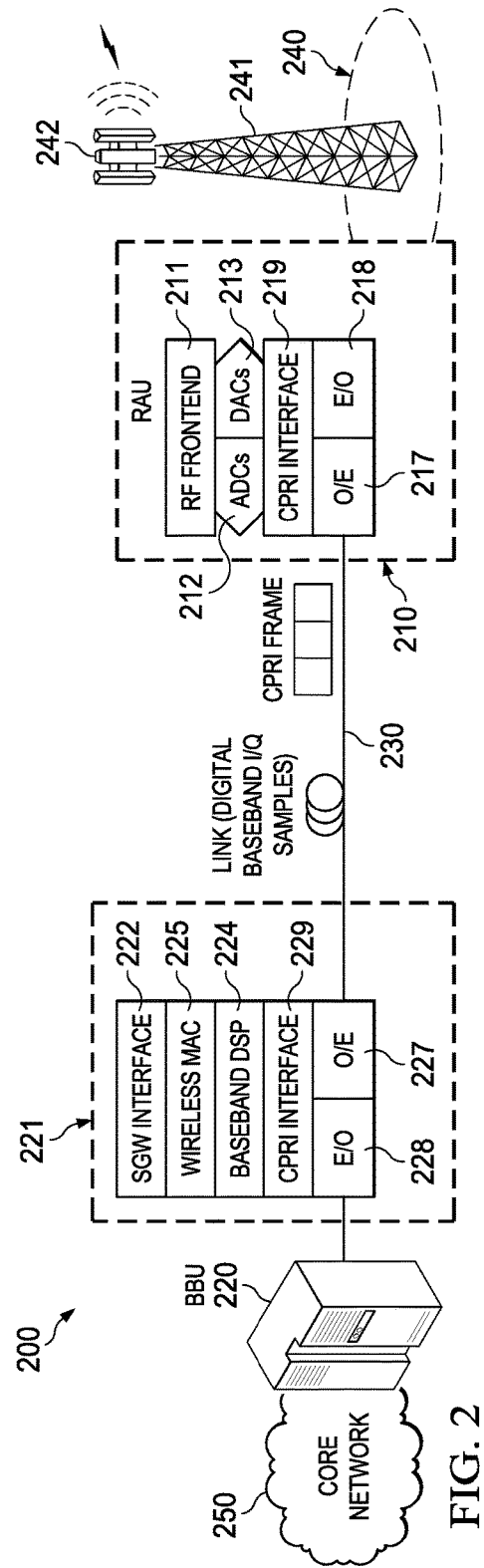
FIG. 1
FIG. 2

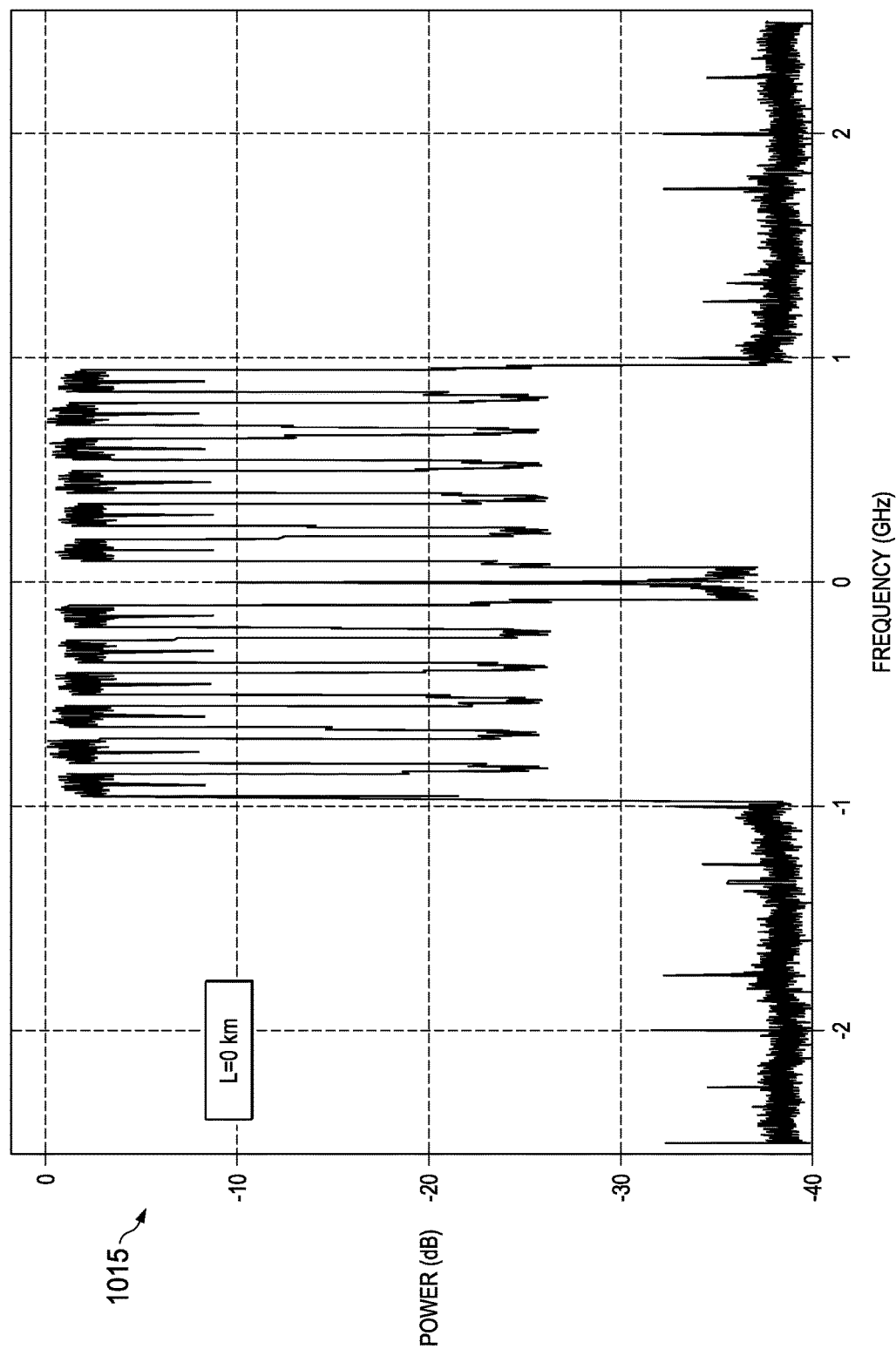

CHANNEL MAPPING FOR AN AGGREGATED TOUCHLESS WIRELESS FRONTHAUL

CROSS-REFERENCE TO RELATED APPLICATIONS

The present application claims priority to U.S. provisional patent application No. 62/073,773 filed Oct. 31, 2014 by Xiang Liu, et. al., and titled "Channel Mapping for an Aggregated Touchless Wireless Fronthaul," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) refers to a network between mobile devices and a core network. In traditional wireless macro-cell networks and mobile macro-cell networks, an area may be divided geographically into a plurality of cells and cell sectors, each served by a wireless base station communicating with the core network. The part of the RAN between the wireless base stations and the core network is referred to as the wireless backhaul. As the demand for high-speed wireless communications continues to increase, reaching the limits of macro cells in terms of the number of locations and penetration capability in indoor or densely-populated areas, research and industry are moving towards small-cell deployments with denser and smaller cells.

Wireless fronthaul and mobile fronthaul are emerging network segments that enable a centralized-RAN (C-RAN) architecture suitable for small-cell deployments. In a C-RAN architecture, the digital baseband (BB) processing that is typically performed at wireless base stations located at remote cell sites is relocated to centralized baseband units (BBUs) located at a central site nearby a central office (CO) or the core network. As such, the wireless base stations located at the remote cell sites are replaced by remote radio units (RRUs) that interface with antennae for wireless radio frequency (RF) transmission and reception without the digital BB processing. Wireless fronthaul refers to the part of the RAN between the RRUs and the BBUs. By relocating the digital BB processing to the centralized BBUs, the C-RAN architecture may enable resource sharing and coordinated multipoint (COMP) processing, such as joint signal processing, joint interference mitigation, and/or joint scheduling among multiple cells, and thus may improve network performance and efficiency.

Wireless fronthaul may be enabled by optical fiber communication technologies, where optical fiber links are employed for transporting signals between the RRUs located at the remote cell sites and the BBUs located at the central site. Some advantages of optical fiber transmission include low power loss, low latency, and high bandwidth (BW). However, the employment of optical fibers and optical hardware add cost to the wireless fronthaul network. Thus, efficient use of optical fiber links and optical hardware are important in wireless fronthaul design.

SUMMARY

In one embodiment, the disclosure includes a method implemented by a wireless fronthaul unit, the method comprising aggregating a plurality of first wireless channel signals to produce a first aggregated signal via digital frequency-domain mapping (FDM), wherein the first wireless channel signals are positioned in the first aggregated signal in non-overlapping first frequency bands, each non-overlapping first frequency band having a first bandwidth and a center frequency, wherein each respective center frequency is an odd integer multiple of a lowest center frequency, converting the first aggregated signal into a first modulated signal, and transmitting the first modulated signal to a wireless fronthaul link.

In another embodiment, the disclosure includes a wireless fronthaul unit comprising an optical frontend configured to receive wireless uplink signals, and a channel aggregation unit coupled to the optical frontend and configured to aggregate the wireless signals via digital FDM to produce an aggregated signal, wherein the wireless signals are positioned in the aggregated signal in frequency bands, wherein each frequency band has a first bandwidth and a center frequency, and wherein each center frequency is an odd integer multiple of a lowest center frequency.

In yet another embodiment, the disclosure includes a wireless fronthaul unit comprising a receiver configured to receive an aggregated signal comprising a plurality of aggregated wireless signals, wherein the wireless signals are positioned in the aggregated signal in frequency bands, wherein each frequency band has a first bandwidth and a center frequency, and wherein each center frequency is an odd integer multiple of a lowest center frequency, and a deaggregation unit coupled to the receiver and configured to determine a channel map, and deaggregate, based on the channel map, the aggregated signal to produce the wireless signals.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a schematic diagram of a wireless backhaul communication system.

FIG. 2 is a schematic diagram of a digital baseband (BB) wireless fronthaul communication system.

FIG. 9 is a schematic diagram of an embodiment of a setup for an aggregated wireless fronthaul communication system.

FIG. 10A is a graph illustrating frequency spectra for an aggregated signal measured from the system of FIG. 9 when using seamless channel mapping and a fiber length of 0 kilometers (km).

DETAILED DESCRIPTION

Figure 3:
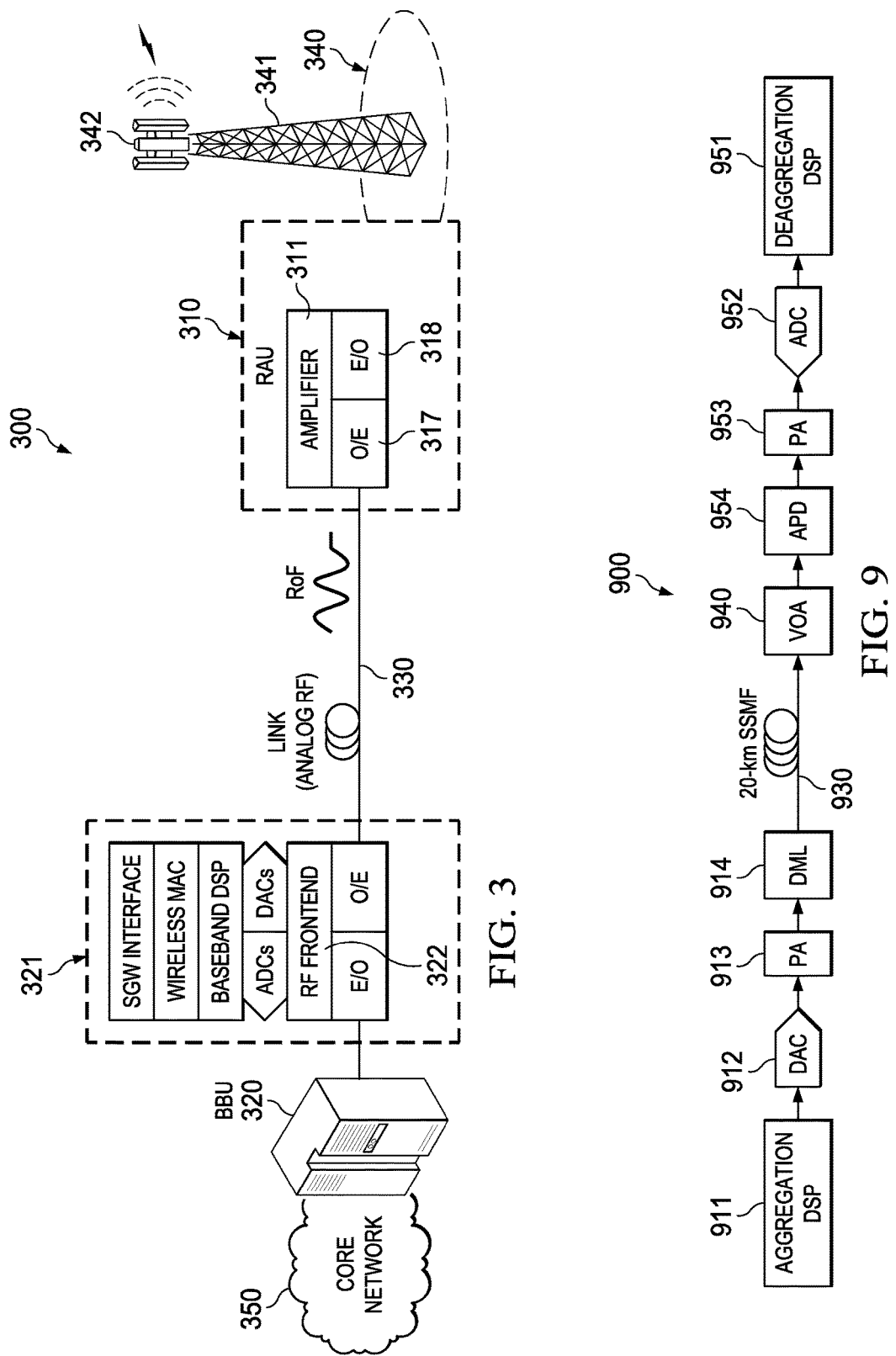
FIG. 3 is a schematic diagram of an analog wireless fronthaul communication system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

FIGS. 1-4 illustrate and compare the evolving wireless communication infrastructure from a wireless backhaul communication system to a wireless fronthaul communication system. The figures compare the different wireless fronthaul configurations proposed by industry and research. The focus is on providing cost-effective and power-efficient wireless fronthauls to enable high-capacity wireless access.

FIG. 1 is a schematic diagram of a wireless backhaul communication system 100. The system 100 is employed in a traditional macro-cell wireless network. The system 100 comprises a wireless base station 110 communicatively coupled to a central office (CO) 120 through a link 130, which is a bi-directional link. The wireless base station 110 is located at a cell site 140 and is installed at a fixed location, for example, at the bottom of a cell tower 141. The CO 120 connects the wireless base station 110 to a core network 150.

The cell site 140 is a geographical area located at a remote location away from the CO 120 and comprises one or more cell sectors, which may be determined during network deployment by mobile operators. The cell site 140 covers an area with a radius that ranges from about one km to about 20 km in a macro-cell wireless network. The cell tower 141 is an elevated structure and holds radio communication equipment such as antennas 142 for communicating to mobile stations located within the coverage of the antennas 142 and the cell site 140. The antennas 142 are electrical devices such as directional antennas, omnidirectional antennas, or antenna array structures and convert electrical power into radio waves, and vice versa. For example, the antennas 142 are positioned at the top of the cell tower 141 to generate a wireless radio frequency (RF) coverage in the cell site 140.

The wireless base station 110 comprises an RF frontend 111, analog-to-digital converters (ADCs) 112, digital-to-analog converters (DACs) 113, a BB digital signal processing (DSP) unit 114, a wireless media access control (MAC) unit 115, a gigabit Ethernet (GbE) interface 116, an optical-to-electrical (O/E) frontend 117, and an electrical-to-optical (E/O) frontend 118. The RF frontend 111 comprises analog electrical components such as power amplifiers (PAs), low-noise amplifiers (LNAs), and filters. The RF frontend 111 is coupled to the antennas 142 and communicates RF signals with the mobile stations. The ADCs 112 and the DACs 113 are coupled to the RF frontend 111. The BB DSP unit 114 is coupled to the ADCs 112 and the DACs 113. The wireless MAC unit 115 is coupled to the BB DSP unit 114. The GbE interface 116 couples the wireless MAC unit 115 to the O/E frontend 117 and the E/O frontend 118. The GbE interface 116 is a hardware device configured to transmit Ethernet frames at a rate of about one gigabit per second (Gbps). The E/O frontend 118 comprises E/O components such as electrical drivers, E/O converters, and a laser. The E/O frontend 118 converts electrical signals into an optical signal by modulating the electrical signals onto an optical carrier signal and transmitting the optical signal to the CO 120 via the link 130. The O/E frontend 117 comprises O/E components such as electrical drivers, O/E converters, and a laser. The O/E frontend 117 converts an optical signal into one or more electrical signals.

In an uplink (UL) direction, the ADCs 112 convert analog RF signals received from the mobile stations into digital signals, where UL refers to the transmission direction from the mobile stations towards the CO 120. In a downlink (DL) direction, the DACs 113 convert the digital signals generated by the BB DSP unit 114 into analog signals, where DL refers to the transmission direction from the CO 120 towards the mobile stations. The ADCs 112 and the DACs 113 manipulate individual wireless signals, and their sampling rates are determined by the signal bandwidths and the oversampling ratios in use by the wireless base station 110. For example, the ADCs 112 and the DACs 113 operate at a sampling rate of about 30 megahertz (MHz) corresponding to about 30 mega-samples per second (MSa/s) for a 20-MHz-bandwidth wireless channel with an oversampling ratio of about 1.5. The sampling resolution may be between about 4 bits and about 20 bits.

The BB DSP unit 114 performs physical layer BB DSP functions such as signal synchronization, modulation, demodulation, channel pre-equalization, channel equalization, error encoding, and error decoding. The wireless MAC unit 115 performs MAC layer processing functions such as packet processing, error control, scheduling, and channel mapping. For example, the BB DSP functions and the wireless MAC processing functions are performed according to a particular wireless communication protocol such as Long-Term Evolution (LTE) and LTE-advance (LTE-A) as defined in the 3rd Generation Partnership Project (3GPP) specifications. The BB processing functions are computationally intensive and complex, thus the cost and power consumption of the wireless base station 110 may be high.

The CO 120 comprises switching components such as server gateways (SGWs); control and management elements for access control, mobility support, and security control; and an interface unit 121 that interfaces the wireless base station 110 and the mobile stations to the core network 150 to provide network services such as voice calls, emails, and other Internet services. The interface unit 121 comprises an SGW interface 122, a GbE interface 126, an O/E frontend 127, and an E/O frontend 128. The GbE interface 126, the E/O frontend 128, and the O/E frontend 127 are similar to the GbE interface 116, the O/E frontend 117, and the E/O frontend 118. The SGW interface 122 interfaces to the SGW, which routes and forwards user data packets between the mobile stations and the CO 120 received via the link 130, as well as between the CO 120 and the core network 150.

The core network 150 is a central part of a network that provides network services to the users of the mobile stations. The core network 150 comprises one or more interconnected sub-networks operated by network providers or service providers. The link 130 is a cable link comprising coaxial cables, a free-space microwave link comprising a line-of-sight propagation path, or an optical fiber link comprising an SSMF or a multi-mode fiber (MMF). The link transports digital baseband (BB) signals carrying Ethernet frames between the wireless base station 110 and the CO 120. Since optical fibers may provide significantly lower power loss, higher speed, and higher BW than cables, many macro-cell networks employ optical fibers instead of cables. In short, the system 100 is expensive to deploy, especially for a small-cell network, due to the high-cost wireless base stations 110 distributed at the cell sites 140.

FIG. 2 is a schematic diagram of a digital BB wireless fronthaul communication system 200. The system 200 is suitable for employment in a centralized-RAN (C-RAN). The system 200 comprises a remote access unit (RAU) 210 communicatively coupled to a baseband unit (BBU) 220 through a link 230. The RAU 210 is located at a cell site 240 and connected to one or more antennas 242 installed close to the top of a cell tower 241. The acronyms RAU and RRU may be used interchangeably. The BBU 220 is located at a site near a core network 250 and connects the RAU 210 to the core network 250. The cell site 240, the cell tower 241, the antennas 242, and the core network 250 are similar to the cell site 140, the cell tower 141, the antennas 142, and the core network 150, respectively. In the system 200, the computationally-intensive BB DSP functions and the wireless MAC processing functions are separated from the RAU 210 and moved to the BBU 220.

The RAU 210 comprises an RF frontend 211, ADCs 212, DACs 213, a Common Public Radio Interface (CPRI) interface 219, an O/E frontend 217, and an E/O frontend 218. The RF frontend 211, the ADCs 212, the DACs 213, the O/E frontend 217, and the E/O frontend 218 are similar to the RF frontend 111, the ADCs 112, the DACs 113, the O/E frontend 117, and the E/O frontend 118, respectively. The CPRI interface 219 is positioned between the ADCs 212 and the E/O frontend 218, as well as between the DACs 213 and the O/E frontend 217. The CPRI interface 219 interfaces with a CPRI device (not shown). The CPRI device performs CPRI protocol processing such as physical layer signaling and line control and data link layer framing, mapping, and flow control.

In a UL direction, the RAU 210 receives UL RF signals from mobile stations via the antennas 242. The ADCs 212 convert the received UL RF signals into digital in-phase/quadrature-phase (I/Q) samples, the CPRI device encodes the digital I/Q samples into CPRI frames comprising binary bits, and the E/O frontend 218 converts the CPRI frames into an optical signal by, for example, employing binary on-off-keying (OOK), and transmits the optical signal to the BBU 220 via the link 230. In a DL direction, the RAU 210 receives an optical signal carrying CPRI-encoded DL signals from the BBU 220 via the link 230. The O/E frontend 217 converts the received optical signal into electrical CPRI-encoded DL signals. The CPRI device decodes the CPRI encoded DL signals to produce the digital I/Q samples, and the DACs 213 convert the digital I/Q samples into analog electrical RF signals for transmission to the mobile stations via the antennas 242.

The link 230 comprises an optical fiber such as an SSMF or an MMF. The link 230 transports digital BB I/Q samples between the RAU 210 and the BBU 220 according to a CPRI protocol defined in CPRI Specification V4.1, which is incorporated by reference. For example, the link 230 transports CPRI frames carrying the digital BB I/Q samples.

The BBU 220 comprises an internal unit 221 comprising an SGW interface 222, a wireless MAC unit 225, a BB DSP unit 224, a CPRI interface 229, an O/E frontend 227, and an E/O frontend 228. The SGW interface 222, the wireless MAC unit 225, the BB DSP unit 224, the CPRI interface 229, the O/E frontend 227, and the E/O frontend 228 are similar to the SGW interface 122, the wireless MAC unit 115, the BB DSP unit 114, the CPRI interface 219, the O/E frontend 117, and the E/O frontend 118, respectively. Although a single BBU 220 is illustrated in the system 200, the system 200 may employ a centralized processing scheme by placing a pool of BBUs 220 at a site near the core network 250 to enable resource sharing and radio collaboration among the BBUs 220.

The system 200 employs a one-to-one mapping between the antennas 242 and the link 230. For example, a separate connection between the RAU 210 and the BBU 220 via the link 230 is required for each wireless RF channel, where each RAU 210 and BBU 210 employs an optical transceiver. As such, the number of links 230 and the associated optical hardware multiply with the number of wireless RF channels and the number of antennas 242. In addition, the data throughput between the RAU 210 and the BBU 220 in the system 200 is high. For example, to support an 8×8 multiple-input and multiple-output (MIMO) LTE 20 MHz channel with an oversampling ratio of about 1.5 and a sample resolution of about 15 bits, the data throughput is about 10 Gbps, including the CPRI protocol overhead, which may be about 25 percent (%) for an 8-bit symbol to 10-bit symbol mapping (8b/10b) line coding scheme. As such, a pair of 10 Gbps optical transceivers is needed to transport a signal with a BW of about 20 MHz. Thus, the system 200 is not BW efficient or cost effective.

FIG. 3 is a schematic diagram of an analog wireless fronthaul communication system 300. The system 300 comprises an RAU 310 communicatively coupled to a BBU 320 through a link 330. The system 300 comprises a similar configuration as in the system 200, and the link 330 is similar to the link 230. However, the link 330 transports analog RF signals between the RAU 310 and the BBU 320 instead of the digital BB I/Q samples as in the system 200, thus simplifying the processing at the RAU 310 when compared to the RAU 210.

The RAU 310 comprises one or more amplifiers 311, an O/E frontend 317, and an E/O frontend 318. The O/E frontend 317 and the E/O frontend 318 are similar to the O/E frontend 117 and the E/O frontend 118, respectively. The amplifier 311 is configured to interface to antennas 342 located at a cell tower 341, where the antennas 342 and the cell tower 341 are similar to the antennas 142 and the cell tower 141, respectively. The amplifiers 311 are RF devices that amplify the RF signals received from the mobile stations or the RF signals that are to be transmitted to the mobile stations via the antennas 342. The antennas 342 may be part of the RAU 310.

The BBU 320 comprises an internal unit 321 similar to the internal unit 221 at the BBU 220. However, the BBU 320 comprises an RF frontend 322 instead of a CPRI interface as in the internal unit 221 because the BBU 320 communicates RF signals with the RAU 310 over the link 330. The RF frontend 322 is similar to the RF frontend 111 or 211.

Although the processing at the RAU 310 is simplified, the RAU 310 employs optical and electrical components with larger bandwidths than the signal bandwidths of the analog RF signals due to the analog RF signals comprising center frequencies higher than the signal bandwidths, where the center frequencies are pre-determined according to various wireless transmission standards. Thus, the system 300 is bandwidth inefficient. Although analog frequency downshifting may be applied to improve bandwidth efficiency, the complexity of the required analog hardware becomes substantially higher. For example, to realize RF frequency down-shifting, an analog I/Q modulator and a local oscillator operate at a frequency equal to the amount of frequency down-shifting. Due to the power loss associated with the analog I/Q modulator, the RAU 310 may additionally employ an RF power amplifier to compensate the power loss. In addition, analog I/Q modulators may have narrow operating frequency bands for frequency-shifting the analog RF signal, thus dedicated I/Q modulators may be employed to shift RF signals with different center frequencies. This increases implementation complexity and limits the system flexibility.

Figure 4:
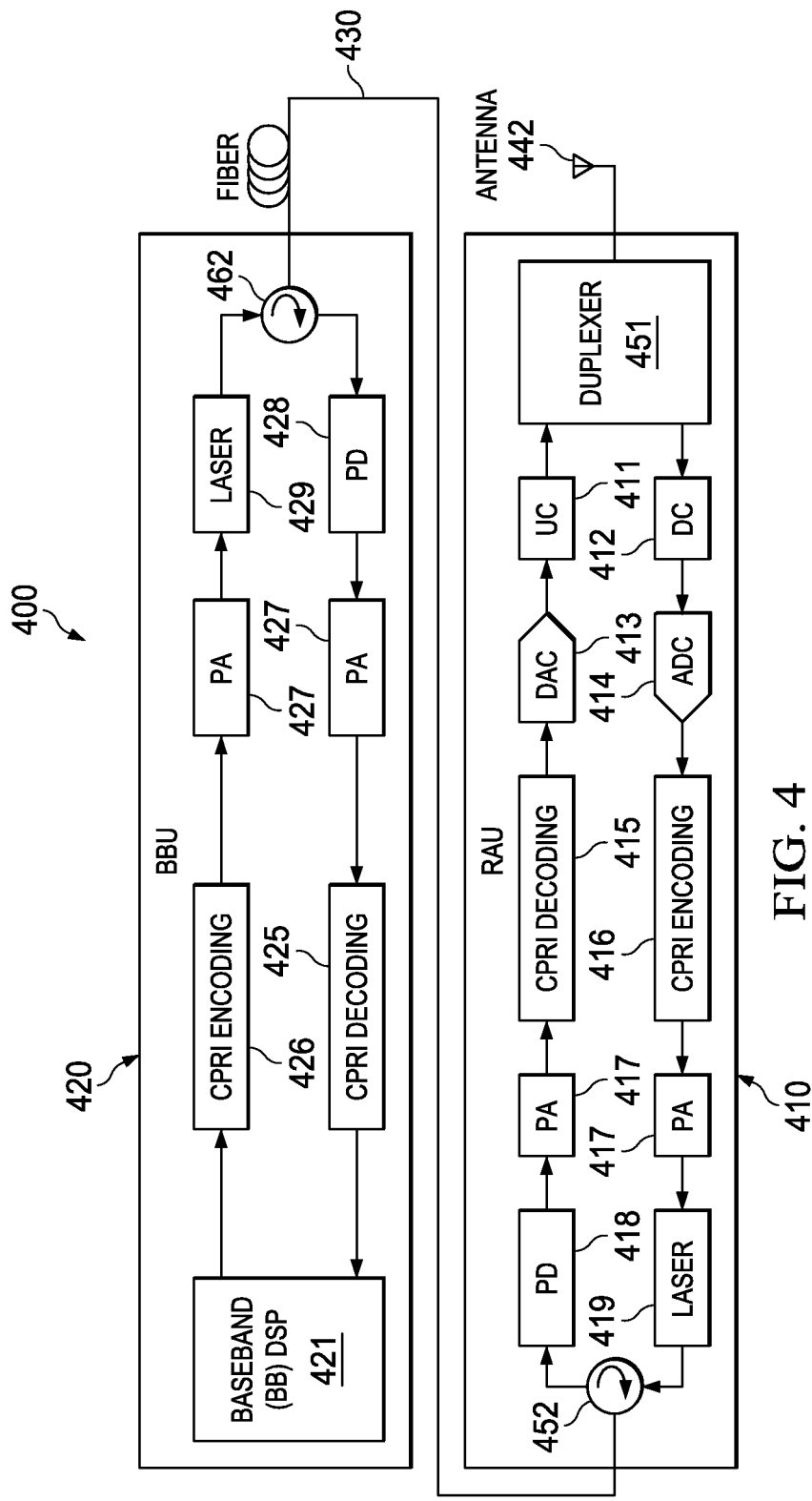
FIG. 4 is a schematic diagram of another digital BB wireless fronthaul communication system.

FIG. 4 is a schematic diagram of another digital BB wireless fronthaul communication system 400. The system 400 is similar to the system 200, but is shown in more detail. The system 400 comprises a RAU 410 communicatively coupled to a BBU 420 through a link 430. The RAU 410, the BBU 420, and the link 430 are similar to the RAU 210, the BBU 220, and the link 230, respectively.

The RAU 410 comprises a duplexer 451, an upconverter (UC) 411, a downconverter (DC) 412, a DAC 413, an ADC 414, a CPRI encoding unit 416, a CPRI decoding unit 415, PAs 417, a photodiode (PD) 418, a laser 419, and an optical circulator 452. The duplexer 451 is communicatively coupled to an antenna 442, which is similar to the antennas 142. The duplexer 451 is an RF device that separates a receiver from a transmitter while allowing the receiver and the transmitter to share the same transmission link. For example, the duplexer 451 operates in the RF band of the antenna 442 and separates the transmitting and receiving RF signals to and from the antenna 442.

In a UL direction at the RAU 410, the DC 412 is coupled to the duplexer 451. The DC 412 is an analog electrical device that downconverts an analog electrical signal from a higher frequency band to a lower frequency band. For example, the DC 412 converts an RF signal received from the antenna 442 into a BB signal, where the RF signal is centered at a suitable frequency and the BB signal is centered at 0 hertz (Hz). The ADC 414 is coupled to the DC 412 and converts the analog BB signals into digital signals, which may comprise digital BB I/Q samples. The CPRI encoding unit 416 is coupled to the ADC 414 and performs CPRI encoding according to the CPRI protocol, which may include both physical layer signaling and data link layer processing and control. A first PA 417 is coupled to the CPRI encoding unit 416. The PAs 417 are electrical devices that provide signal amplification. For example, the first PA 417 amplifies the CPRI signal to suitable voltage levels for transmission. The laser 419 is a light source such as a directly-modulated laser (DML) and produces an optical signal. The amplified CPRI signal is modulated onto the optical signal by, for example, employing an OOK scheme.

In a DL direction at the RAU 410, the PD 418 converts the received DL optical signal into an electrical signal. A second PA 417 is coupled to the PD 418 and amplifies the electrical signal into suitable voltage levels for receiver processing. The CPRI decoding unit 415 is coupled to the second PA 417 and decodes and converts the received signal into digital BB I/Q samples according to the CPRI protocol. The DAC 413 is coupled to the CPRI decoding unit 415 and converts the digital BB I/Q samples into an analog signal. The UC 411 is coupled to the DAC 413 and upconverts the analog signal from the BB back to the original RF band to provide an RF signal suitable for transmission to a mobile station via the antenna 442.

The optical circulator 452 couples the laser 419 and the PD 418 to the link 430. The optical circulator 452 is an optical device that separates optical signals traveling in an opposite direction in an optical fiber. For example, the optical circulator 452 separates the UL optical signal generated by the laser 419 from the DL optical signal received from the BBU 420 via the link 430.

The BBU 420 comprises an optical circulator 462, a laser 429, a PD 428, PAs 427, a CPRI encoding unit 426, a CPRI decoding unit 425, and a BB DSP unit 421. The optical circulator 462, the laser 429, the PD 428, the PAs 427, the CPRI encoding unit 426, and the CPRI decoding unit 425 are similar to the optical circulator 452, the laser 419, the PD 418, the PAs 417, the CPRI encoding unit 416, and the CPRI decoding unit 415, respectively. In the UL direction, the BBU 420 receives the UL optical signal from the RAU 410. For example, the PD 428 is coupled to the optical circulator 462 and converts the received UL optical signal into electrical signals. A first PA 427 is coupled to the PD 428 and amplifies the electrical signals. The CPRI decoding unit 425 is coupled to the first PA 427 and performs similar CPRI decoding as in the CPRI decoding unit 415. The BB DSP unit 421 is coupled to the CPRI decoding unit 425.

The BB DSP unit 421 performs BB DSP functions for both receiving and transmitting for both UL and DL directions according to a wireless communication standard such as LTE or LTE-A. In the UL direction, the BB DSP unit 421 receives UL digital BB I/Q samples and generates data packets for transmission to a core network such as the core network 250. In the DL direction, the BB DSP unit 421 receives data packets from the core network and generates DL digital BB I/Q samples for transmission to the RAU 410. Some examples of BB DSP functions include frame synchronization, data encoding, data decoding, modulation, demodulation, channel pre-equalization, channel equalization, interference mitigation, error encoding, and error decoding. In addition, the BB DSP unit 421 performs wireless MAC layer processing such as packet processing, scheduling, and error control.

In the DL direction, the CPRI encoding unit 426 is coupled to the BB DSP unit 421. The CPRI encoding unit 426 encodes the DL digital BB I/Q samples. A second PA 427 is coupled to the CPRI encoding unit 426 and amplifies the CPRI encoded signal into suitable voltage levels for optical transmission. The laser 429 is coupled to the second PA 427 and modulates the CPRI encoded signal onto the optical signal produced by the laser 429 via, for example, an OOK modulation scheme. Similar to the system 200, the system 400 multiplies with the number of wireless RF channels or the number of antennas 442 in a wireless fronthaul network. Thus, the system 400 is not BW efficient or cost effective.

C-RAN is a promising enabling technology for supporting future wireless communications standards such as Fifth Generation (5G) by offering unique features such as centralized processing and collaborative radio. In a C-RAN network, the fronthaul connects each BBU with each RRU, which may have multiple remote radio heads (RRHs). One approach for the fronthaul connection is to use wavelength-division multiplexing (WDM), but that approach requires many small cells, which are costly. Another approach is to digitize all the available wireless channels and transport the digitized data, but that approach is DSP intensive and inefficient. There is therefore a desire to develop a cost-effective and energy-efficient fronthaul. One such fronthaul is described in U.S. patent application Ser. No. 14/528,823 filed Oct. 30, 2014 by Xiang Liu, et al., and titled "Aggregated Touchless Wireless Fronthaul" ("Liu"), which is incorporated by reference. FIGS. 5-8 illustrate such a fronthaul. The term "touchless" refers to the transportation of wireless RF signals without any digital BB processing and preserving the signal bandwidths or waveform properties of the wireless RF channel signals. The term "aggregated" refers to the aggregation of a plurality of wireless RF channels or wireless RF channel signals transported over an optical fiber link between an RRU and a BBU.

Figure 5:
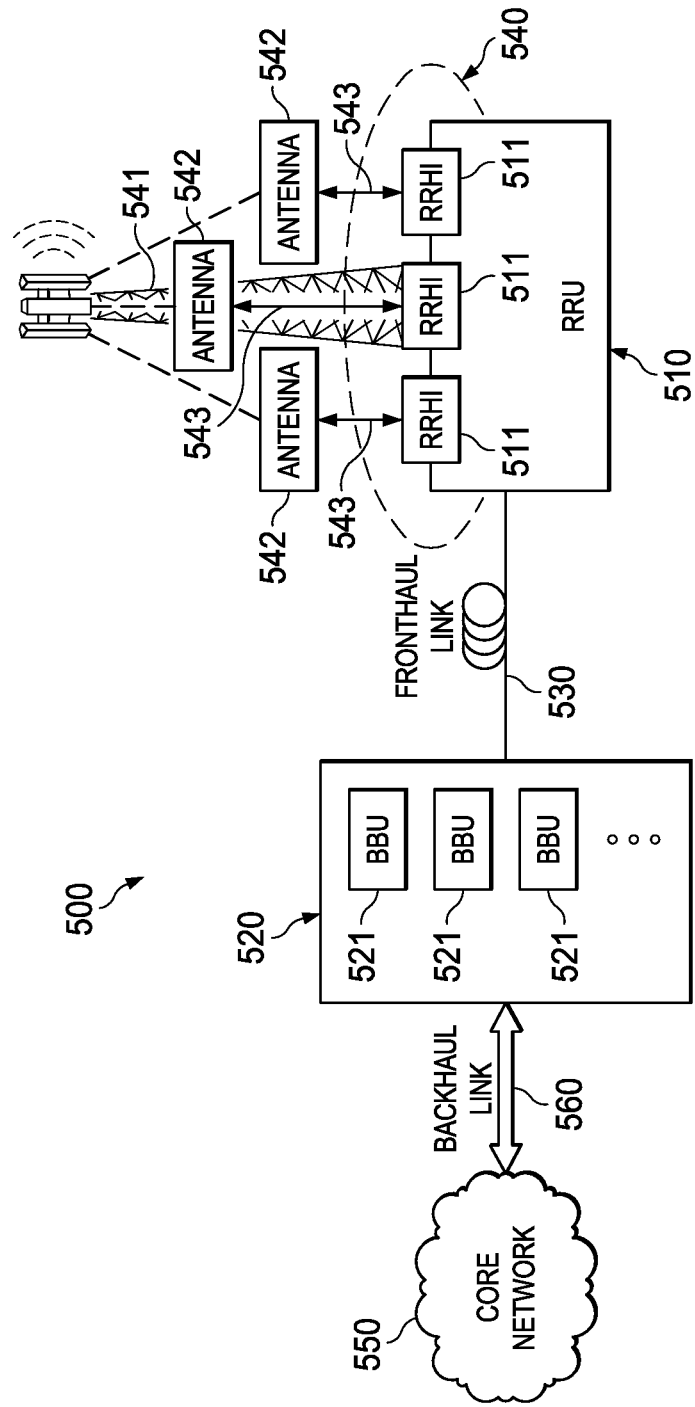
FIG. 5 is a schematic diagram of an aggregated wireless fronthaul communication system according to an embodiment of the disclosure.

FIG. 5 is a schematic diagram of an aggregated wireless fronthaul communication system 500 according to an embodiment of the disclosure. The system 500 is suitable for employment in a C-RAN and small-cell networks. The system 500 comprises an RRU 510 communicatively coupled to a BBU pool 520 through a fronthaul link 530. The RRU 510 is located at a cell site 540. For example, the RRU 510 is installed at the bottom of a cell tower 541 that holds a plurality of antennas 542. The BBU pool 520 connects the RRU 510 to a core network 550 via a backhaul link 560. The cell site 540, the cell tower 541, and the core network 550 are substantially similar to the cell site 140, the cell tower 141, and the core network 150, respectively. When the system 500 is employed in a small-cell network, the cell site 540 may comprise a substantially smaller geographical area than the cell site 140. For example, the cell site 540 may comprise an area with a radius on the order of hundreds of meters (m) instead of tens of km as in the cell site 140. The antennas 542 are substantially similar to the antennas 142, but may comprise different noise figures and power ratings depending on the cell size and cell density of the deployment area. The fronthaul link 530 may be substantially similar to the link 230. However, the fronthaul link 530 is configured to transport aggregated digital RF signals comprising digitized samples with more than two levels instead of the CPRI-encoded BB I/Q samples with two levels as in the system 200 and 400, as discussed more fully below. The backhaul link 560 is substantially similar to the fronthaul link 530, but may transport packets, such as Ethernet packets, between the BBU pool 520 and the core network 550.

The RRU 510 comprises a plurality of RRH interfaces (RRHIs) 511 communicatively coupled to the antennas 542. Each antenna 542 corresponds to a wireless RF channel associated with a particular wireless communication protocol. Some examples of wireless RF channels may include LTE channels, LTE-A channels, or other evolved universal terrestrial radio access (E-UTRA) channels as defined in the 3GPP specifications. Each wireless RF channel corresponds to a UL channel or a DL channel. The wireless RF channels may span various RF bands with various BWs. Some examples of LTE BW configurations may include 1.4 MHz, 3 MHz, 5 MHz, 10 MHz, 15 MHz, and 20 MHz. It should be noted that in the case of a MIMO transmission scheme, each input channel or each output channel is referred to as an RF channel in the present disclosure. For example, to support an 8×8 MIMO transmission scheme, the RRU 510 is configured to process 8 RF input channels and 8 RF output channels. The RRHIs 511 and the antennas 542 are connected via links 543. The links 543 may comprise optical fibers, such as SSMFs or MMFs, RF cables, or free-space microwave connections, and may carry an RF signal, for example, according to a particular RF interface protocol, in an optical signal.

The RRU 510 is configured to serve a plurality of mobile stations (not shown) located in the cell site 540 and within the coverage area of the antennas 542. Each antenna 542 may be communicating with one or more of the mobile stations. In a UL direction, the RRU 510 receives a UL RF signal from each antenna 542 via the RRHI 511 and may downconvert the UL RF signals to the BB to minimize the processing rate. The RRU 510 aggregates the BB signals to produce an aggregated UL signal via a FDM scheme, which includes a pre-determined UL channel map that maps the RF channels to contiguous non-overlapping frequency bands in a frequency spectrum. For example, the RRU 510, in effect, shifts the center frequencies of the downconverted UL RF signals to the non-overlapping frequency bands according to the pre-determined UL channel map and multiplexes the frequency-shifted signals to produce the aggregated UL signal. The RRU 510 converts the aggregated UL signal into a UL optical signal and transmits the UL optical signal to the BBU pool 520.

In a DL direction, the RRU 510 receives a DL optical signal from the BBU pool 520 via the fronthaul link 530. The DL optical signal carries an aggregated DL signal comprising a plurality of DL signals positioned in different non-overlapping frequency bands, where each DL signal is destined for transmission over an antenna 542. The RRU 510 converts the DL optical signal into electrical signals and deaggregates the DL signal by channel deaggregation according to a pre-determined DL channel map. It should be noted that the pre-determined UL and DL channel maps are independent of each other, and may or may not be the same. After channel deaggregation, the BB signals of the aggregated channels are obtained. The RRU 510 upconverts the deaggregated DL signals from the BB to the original RFs that are employed for transmission over the antennas 542.

The BBU pool 520 comprises a plurality of BBUs 521 configured to perform BB DSP functions and wireless MAC processing functions according to a wireless communication protocol, channel aggregation in use, channel deaggregation, frequency upconversion, and frequency downconversion. In the UL direction, when a BBU 521 receives the UL optical signal carrying the aggregated UL signal from the RRU 510 via the fronthaul link 530, the BBU 521 converts the optical signal into electrical signals. The BBU 521 extracts the UL signals from the aggregated UL signal by channel deaggregation according to the pre-determined UL channel map. The BBU 521 performs BB DSP functions and wireless MAC processing functions to reproduce the data packets transmitted over each of the wireless RF channels and sends the data packets to the core network 550 via the backhaul link 560. It should be noted that the received aggregated UL signal may be a composite intermediate-frequency (IF) signal. An intermediate frequency-to-baseband (IF-to-BB) conversion may be implemented as part of the channel deaggregation, as discussed more fully below.

In the DL direction, the BBU 521 receives DL packets from the core network 550 via the backhaul link 560, where the packets may correspond to the wireless RF channels. The BBU 521 performs wireless MAC processing functions and BB DSP functions to produce digital BB signals. The BBU 521 then aggregates the digital BB signals by performing similar FDM as in the RRU 510 to produce the aggregated DL signal, converts the aggregated DL signal into an optical signal, and sends the optical signal to the RRU 510. It should be noted that the aggregated DL signal is a composite IF signal and a BB-to-IF conversion may be implemented as part of the channel aggregation, as discussed more fully below.

Although the above embodiments describe the BBU processing with respect to a BBU 521, some of the BBU processing may be distributed over multiple BBUs 521 located at the BBU pool 520 and may additionally include joint signal processing or coordinated multipoint (COMP) functions across multiple RRUs, similar to the RRU 510, and/or multiple antennas, similar to the antennas 542.

Figure 6:
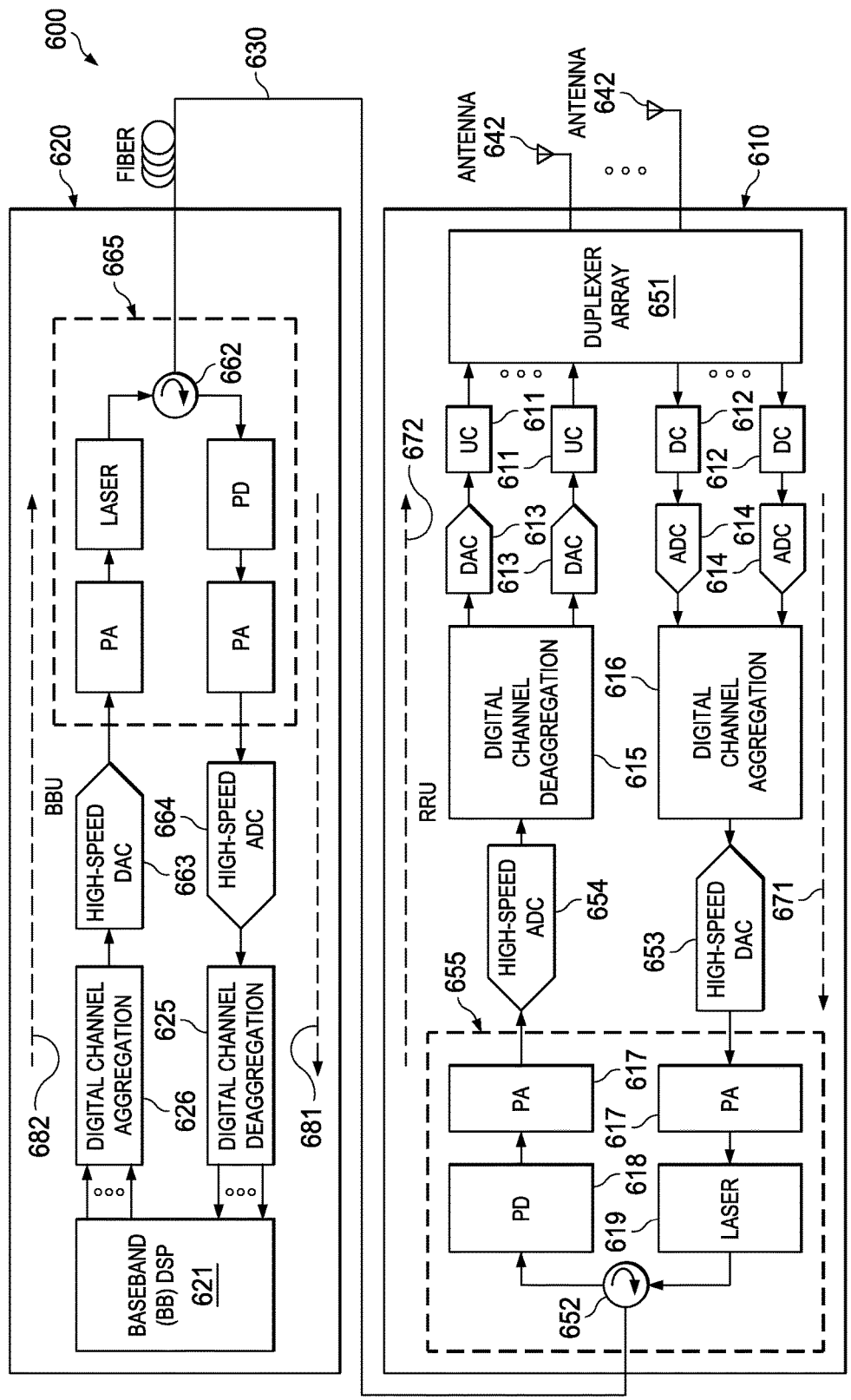
FIG. 6 is a schematic diagram of another embodiment of an aggregated wireless fronthaul communication system.

FIG. 6 is a schematic diagram of another embodiment of an aggregated wireless fronthaul communication system 600. The system 600 is similar to the system 500, and further provides a detailed view of the system 500. The system 600 comprises an RRU 610 communicatively coupled to a BBU 620 through a link 630, similar to the fronthaul link 530. The RRU 610 and the BBU 620 are detailed block diagram views of the RRU 510 and the BBU 520, respectively. In the system 600, the RRU 610 and the BBU 620 transmit and receive aggregated UL signals and aggregated DL signals carried in optical signals over the link 630. The aggregated UL signal comprises a plurality of UL channel signals positioned in adjacent non-overlapping first frequency bands, whereas the aggregated DL signal comprises a plurality of DL channel signals positioned in adjacent non-overlapping second frequency bands. For example, the system 600 employs a pre-determined UL channel map for mapping the UL channel signals to the first frequency bands and a pre-determined DL channel mapping the DL channel signals to the second frequency bands. In the system 600, both the RRU 610 and the BBU 620 perform channel aggregation and channel deaggregation in a digital domain, where the UL channel signals and DL channel signals are digitized without BB processing or signal conversions, such as CPRI signal encoding, or decoding. Thus, the waveform properties and the BWs of the BB signals are unchanged. Both the RRU 610 and the BBU 620 may employ a similar optical transmission scheme, for example, an intensity modulation (IM) scheme, at a transmitter and a similar optical detection scheme, for example, a direct-detection (DD) scheme, at a receiver.

The RRU 610 comprises a duplexer array 651, a plurality of UCs 611, a plurality of DCs 612, a plurality of DACs 613, a plurality of ADCs 614, a digital channel deaggregation unit 615, a digital channel aggregation unit 616, a high-speed ADC 654, a high-speed DAC 653, and an optical frontend 655. The duplexer array 651 is communicatively coupled to a plurality of antennas 642, similar to the antennas 542. The duplexer array 651 is an RF device or an RF component configured to separate the sending and receiving RF signals to and from the antennas 642. The UCs 611, the DCs 612, the DAC 613, and the ADCs 614 are similar to the UC 411, the DC 412, the DAC 413, and the ADC 414, respectively. The UCs 611 and 411 may be components and devices, such as RF I/Q modulators, configured to frequency upconvert an input signal. The DCs 612 and 412 may be components and devices, such as RF I/Q modulators, configured to frequency downconvert an input signal. The optical frontend 655 comprises a plurality of PAs 617, a PD 618, a laser 619, and an optical circulator 652. The PAs 617, the PD 618, the laser 619, and the optical circulator 652 are similar to the PAs 417, the PD 418, the laser 419, and the optical circulator 452, respectively.

In a UL direction at the RRU 610, the DCs 612 are coupled to the duplexer array 651 and the ADCs 614 are coupled to the DCs 612. A DC 612 and ADC 614 pair operates on a UL channel signal received from an antenna 642, where the DC 612 downconverts the UL channel signal from an RF band into the BB to produce the BB signal. The ADC 614 comprises two converters configured to convert the I and Q component of the BB signal into a digital BB signal. The digital channel aggregation unit 616 is coupled to the ADCs 614 and configured to aggregate the digital BB signals into an aggregated UL signal. For example, the digital channel aggregation unit 616 in effect shifts each digital BB signal to the first frequency bands according to the pre-determined UL channel map and combines the frequency-shifted digital IF signals. The high-speed DAC 653 is coupled to the digital channel aggregation unit 616 and configured to convert the aggregated UL signal into an analog electrical signal. It should be noted that the high-speed DAC 653 operates at a high sampling rate, for example, in the order of gigasamples per second (GSa/s) depending on the number of aggregated channels and the BWs of the channels, as discussed more fully below. A first of the PAs 617 is coupled to the high-speed DAC 653 and configured to amplify the aggregated UL signal to suitable voltage levels for transmission. The laser 619 is coupled to the first PA 617 and configured to modulate the aggregated signal onto an optical signal generated by the laser 619, for example, by employing the IM scheme. The optical circulator 652 couples the laser 619 and the PD 618 to the link 630.

In a DL direction at the RRU 610, the PD 618 converts a received optical DL signal into an analog electrical signal, for example, by employing the DD scheme. A second of the PAs 617 is coupled to the PD 618 and configured to amplify the electrical signal into suitable voltage levels for receiver processing. The high-speed ADC 654 is coupled to the second PA 617 and configured to convert the analog electrical signal into digital signals. Similar to the high-speed DAC 653, the high-speed ADC 654 operates at a high sampling rate in the order of GSa/s. The digital channel deaggregation unit 615 is coupled to the high-speed ADC 654 and configured to perform channel deaggregation according to the pre-determined DL channel map to produce a plurality of the DL BB signals corresponding to the DL channels. The DACs 613 are coupled to the channel deaggregation unit 615 and configured to convert the I and Q components of each of the DL channel signals into analog electrical signals. The UCs 611 are coupled to the DACs 613 and configured to upconvert the analog electrical signals from the BB to the original RF band for transmission via the antennas 642.

The BBU 620 comprises an optical frontend 665, a high-speed DAC 663, a high-speed ADC 664, a digital channel aggregation unit 626, a digital channel deaggregation unit 625, and a BB DSP unit 621. The optical frontend 665, the high-speed DAC 663, the high-speed ADC 664, the digital channel aggregation unit 626, and the digital channel deaggregation unit 625 are similar to the optical frontend 655, the high-speed DAC 653, the high-speed ADC 654, the digital channel aggregation unit 616, and the digital channel deaggregation unit 615, respectively. As shown in the system 600, the UL path (shown as 681) of the BBU 620 and the DL path (shown as 672) of the RRU 610 are similar, while the DL path (shown as 682) of the BBU 620 and the UL path (shown as 671) of the RRU 610 are similar. However, the BBU 620 further comprises a BB DSP unit 621, similar to the BB DSP unit 421, coupled to the digital channel aggregation unit 626 and the digital channel deaggregation unit 625. The BB DSP unit 621 is configured to perform BB DSP functions for the UL channels and the DL channels. For example, in the DL direction, the BB DSP unit 621 generates BB signals for DL channels based on DL packets received from a core network, such as the core network 550, and the digital channel aggregation unit 626 aggregates the DL BB signals. In the UL direction, the digital channel deaggregation unit 625 deaggregates the UL channel signals into multiple UL BB signals and the BB DSP unit 621 converts the UL BB signals into UL packets for transmission to the core network. It should be noted that the digital channel aggregation unit 616 and the digital channel deaggregation unit 615 at the RRU 610, as well as the digital channel aggregation unit 626 and the digital channel deaggregation unit 625 at the BBU 620 are suitable for implementation in a DSP unit, which may be a lower performance DSP unit than the BB DSP unit 621.

Figure 7:
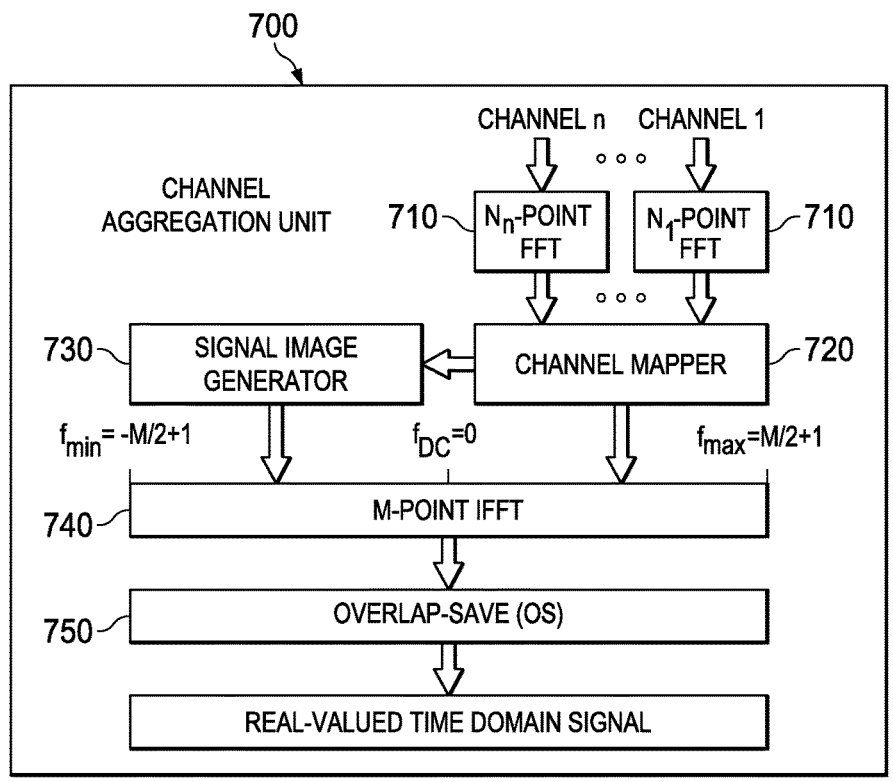
FIG. 7 is a schematic diagram of an embodiment of a channel aggregation unit that employs a frequency domain implementation scheme.

FIG. 7 is a schematic diagram of an embodiment of a channel aggregation unit 700 that employs a frequency domain implementation scheme. The channel aggregation unit 700 is employed by an RRU, such as the RRU 510 and 610, and/or a BBU, such as the BBU 520 and 620. The channel aggregation unit 700 is similar to the digital channel aggregation units 616 and 626. When employing the channel aggregation unit 700 at the RRU, the channel aggregation unit 700 may be implemented by a low-performance and/or low-cost DSP unit. When employing the channel aggregation unit 700 at the BBU, the channel aggregation unit 700 may be implemented by the same BB DSP unit, such as the BB DSP unit 621, that implements the BB DSP functions.

The channel aggregation unit 700 comprises a plurality of fast Fourier transform (FFT) units 710, a channel mapper 720, a signal image generator 730, an inverse FFT (IFFT) unit 740, and an overlap-save (OS) unit 750. The FFT units 710 are configured to transform signals from a time domain into a frequency domain. Each FFT unit 710 operates on a signal corresponding to a particular wireless RF channel (shown as channel 1, . . . , channel n), which may comprise any suitable channel configuration. Each FFT unit 710 is configured to perform an N-point FFT, where N is a positive integer corresponding to the FFT size. The FFT size may be different for a different FFT unit 710 depending on the BW of the signal processed by the FFT unit 710, as discussed more fully below.

The channel mapper 720 is coupled to the FFT units 710 and configured to map the frequency signals produced by the FFT units 710 to adjacent non-overlapping frequency bands or FFT bins to produce an aggregated frequency signal, denoted as E(f), spanning a positive frequency band between $f_{DC}$ and $f_{MAX}$, where $f_{DC}$ corresponds to the frequency bin number 0 at direct current frequency 0 Hz and $f_{MAX}$ corresponds to the frequency bin number M/2+1. It should be noted that $f_{DC}$ also corresponds to the optical carrier frequency when the signal produced by the channel aggregation unit 700 is converted to an optical signal, for example, by employing an optical frontend similar to the optical frontend 665. The frequency of $f_{MAX}$ depends on the sampling rate of the FFT, as discussed more fully below.

The signal image generator 730 is coupled to the channel mapper 720 and configured to generate an image signal that is a complex conjugate of the signal E(f), denoted as E*(f). As such, the image signal E*(f) is a spectral mirror image of the signal E(f) folded at direct current. For example, the signal E*(f) spans a negative frequency band between $f_{DC}$ and $f_{MN}$, where $f_{IN}$ corresponds to the frequency bin −M/2+1. Thus, E*(f)=E(−f).

The IFFT unit 740 is coupled to the channel mapper 720 and the signal image generator 730 and configured to perform an M-point IFFT, where the value M is a positive integer substantially larger than the value N and corresponds to the IFFT size of the IFFT unit 740. The IFFT unit 740 operates at an aggregated sampling rate (ASR), where the ASR and the value M are determined based on the sampling rates, the channel BWs of the input signals at the FFT units 710, and the number of signals for aggregation, as discussed more fully below. It should be noted that the signal image generator 730 is employed such that the IFFT unit 740 produces a real-valued signal according to the FFT symmetry property, where the real-valued signal is suitable for optical IM.

The OS unit 750 is coupled to the IFFT unit 740 and configured to perform OS with an overlapping length, denoted as L. The overlapping length L may be configured as follows:

$$L \geq 2 \times \left(\frac{M}{n}\right) \quad (1)$$

where n is the smallest FFT size of the FFT units 710.

The OS unit 750 extracts the center M−L samples for every M samples generated by the IFFT unit 740. Thus, the number of samples advances in each FFT/IFFT cycle for a channel i is computed as follows:

$$\frac{(M-L) \times N_i}{M} \quad (2)$$

where $N_i$ represents the FFT size employed by the $i^{th}$ FFT unit 710 for the channel i.

The touchless aggregation is achieved by maintaining the same channel BW for each channel i during channel aggregation and channel deaggregation. For example, the FFT sizes, $N_i$, for the FFT units 710 and the IFFT size, M, for the IFFT unit 740 are selected based on the sampling rates, the number of channels, and the BWs of the channels such that each wireless channel i corresponds to an integer number of IFFT points. It should be noted the FFT units 710 employ a relatively smaller FFT size, yet provide sufficient system performance.

In a wireless fronthaul system, a spectral resolution for the IFFT unit 740 is computed as follows:

$$df = \frac{SR_{min}}{n} \quad (3)$$

where df is the spectral resolution, $SR_{min}$ is the minimum sampling rate (SR) of the wireless or mobile signals in the system, and n is the FFT size employed by the FFT unit 710 to process the minimum SR channel signal. The ASR for the IFFT is configured to be about 3 times the total channel BWs of the wireless fronthaul system to provide sufficient spectral resolutions, where a factor 2 is taken into account for the image generation at the signal image generator 730 and a factor of about 1.5 for a moderate oversampling ratio.

For example, to support about eight 5-CA 20 MHz channel signals in a wireless fronthaul system, the IFFT at the unit 740 operates at an ASR computed as shown below:

$$ASR = 3 \times 8 \text{ channels} \times 5 \text{ CA} \times 30.72 \text{ MHz} = 3.7 \text{ GSa/s} \quad (4)$$

where the 20 MHz channels are sampled at an SR of 30.72 MHz. It should be noted that the ASR of the IFFT is preferably selected such that the sampling rate of each wireless channel signal corresponds to an integer number of IFFT points in a frequency domain. In this case, the bandwidths of the frequency bands allocated to the wireless channel signals in the aggregated signal correspond to respective sampling rates of the wireless channel signals.

The IFFT size is computed as shown below:

$$IFFT \text{ size} = \frac{ASR}{df} \quad (5)$$

By substituting equations (3) and (4) into equation (5) and assuming $SR_{min}$ to be about 1.92 MHz and n to be about 4, a 8192-point IFFT is sufficient to support the wireless fronthaul system. It should be noted that the values M, L, n, df, and ASR for each wireless fronthaul system are configured according to the number of channels, and the total channel BWs, etc.

As an example, channel 1 may be a 1.4 MHz-BW channel sampled at about 1.92 MHz, and may be first converted to the frequency-domain by a 4-point FFT, before being multiplexed with other channels by a 8192-point IFFT, resulting in an ASR of about 3.93216 gigahertz (GHz) (=1.92 MHz× 8192/4). When L is selected to be M/2, channel 1 advances by 2 samples after each FFT/IFFT cycle according to equation (2). To maintain a fixed IFFT size and a fixed ASR in the channel aggregation unit 700, a channel 2 with a 20 MHz BW channel sampled at about 30.72 MHz is converted to the frequency domain by a 64-point FFT before being multiplexed with other channels by the same 8192-point IFFT. As such, channel 2 advances by 32 samples after each FFT/IFFT cycle according to equation (2). In some embodiments, a discrete Fourier transform (DFT) and/or an inverse discrete Fourier transform (IDFT) may be employed instead of the FFT and/or IFFT, respectively.

Figure 8:
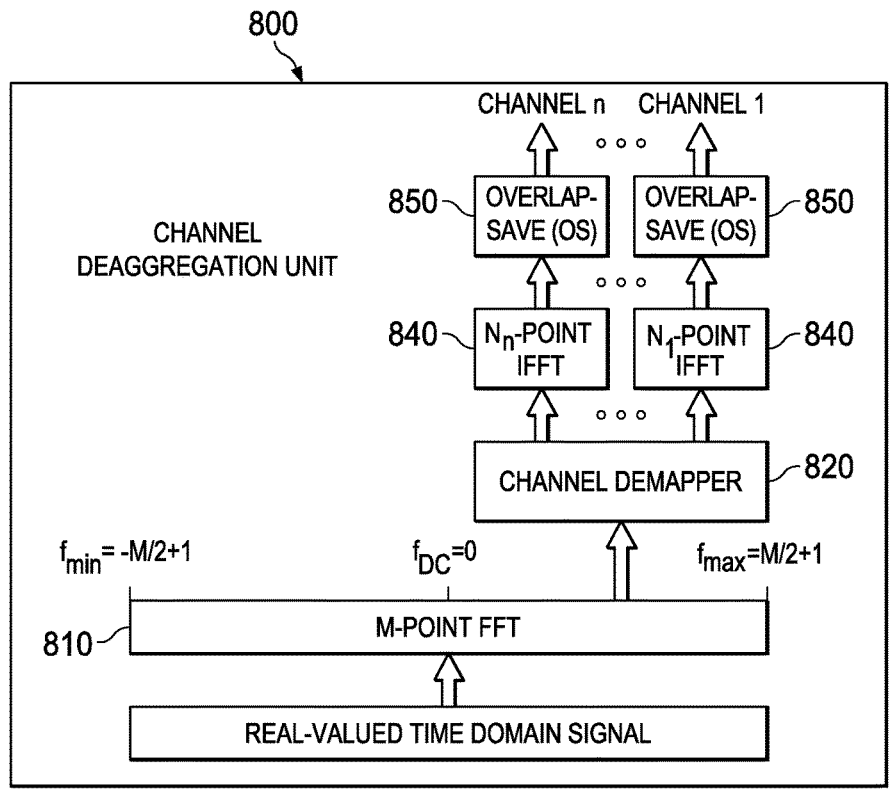
FIG. 8 is a schematic diagram of an embodiment of a channel deaggregation unit that employs a frequency domain implementation scheme.

FIG. 8 is a schematic diagram of an embodiment of a channel deaggregation unit 800 that employs a frequency domain implementation scheme. The channel deaggregation unit 800 is employed by an RRU, such as the RRU 510 and 610, and/or a BBU, such as the BBU 520 and 620. The channel deaggregation unit 800 is similar to the digital channel deaggregation units 615 and 625. The channel deaggregation unit 800 performs digital channel deaggregation in a frequency domain. When employing the channel aggregation unit 700 at the RRU, the channel aggregation unit 700 may be implemented by a lower-performance and/or low-cost DSP unit. When employing the channel aggregation unit 700 at the BBU, the channel aggregation unit 700 may be implemented by the same BB DSP unit, such as the BB DSP unit 621, that implements the BB DSP functions.

The channel deaggregation unit 800 comprises an FFT unit 810, a channel demapper 820, a plurality of IFFT units 840, and a plurality of OS units 850, similar to the OS unit 750. The FFT unit 810 is similar to the FFT unit 710 and may be configured to perform an M-point FFT to convert an aggregated signal from a time domain to a frequency domain to produce a frequency signal, where the aggregated signal is a real-valued signal. The FFT unit 810 operates at an ASR, which may be similar to the ASR at the IFFT unit 740 in the channel aggregation unit 700. The channel demapper 820 is coupled to the FFT unit 810 and configured to demultiplex the frequency signal at the positive frequency band, between $f_{DC}$ and $f_{MAX}$, into a plurality of frequency signals, each corresponding to a particular wireless channel (shown as channel 1, . . . , channel n) according to a pre-determined channel map. The portion of the frequency signal located at the negative frequency band, between $f_{DC}$ and $f_{MIN}$, may be discarded.

Each IFFT unit 840 is similar to the IFFT unit 740 and is configured to perform an N-point IFFT. The IFFT size N may vary for different channels depending on the ASR at the FFT unit 810, the sampling rate and the channel BWs of the channels, and the number of channels.

In a wireless fronthaul system such as the systems 500 and 600, the key parameters such as M, $N_i$, ASR, L, n, and the channel map, which are employed for channel aggregation and channel deaggregation, may be software defined. The key parameters are configured based on the wireless communication protocols in use and the number of channels supported in the system. In addition, the channel aggregation unit and the channel deaggregation unit for a particular transmission direction employ the same value M, the same value $N_i$, the same ASR, the same value L, and the same channel map. For example, in a UL direction, the channel aggregation unit at an RRU, for instance the channel aggregation unit 700 at the RRU 510 and 610, and the channel deaggregation unit at a BBU, for instance the channel deaggregation unit 800 at the BBU 520 and 620, have the same key parameter values. Similarly, in a DL direction, the channel aggregation unit 700 at the BBU and the channel deaggregation unit 800 at the RRU have the same key parameter values.

When low-cost optical transmitters based on DMLs or electro-absorption modulators (EAMs) are used, the interplay between fiber dispersion and signal chirp causes a dispersion-induced penalty. That penalty increases when the aggregated signal bandwidth is relatively high. It is therefore desired to mitigate the transmission impairments when using low-cost DMLs and EAMs in an efficient mobile fronthaul (EMF).

Disclosed herein are embodiments for using low-cost DMLs and EAMs in an EMF. Specifically, the disclosed embodiments provide for channel mapping in the channel aggregation and deaggregation process to mitigate the dispersion-induced penalty and other impairments such as clipping-induced crosstalk, which may be due to severe clipping of the signal amplitude, especially when the severe clipping is asymmetric. In one embodiment, only odd channel slots are populated with mobile signals. In other embodiments, in order to relax the sampling requirements on the ADC and the DAC, various undersampling techniques are used.

FIG. 9 is a schematic diagram of an embodiment of a setup for an aggregated wireless fronthaul communication system 900. The system 900 is similar to the systems 500, 600. The system 900 comprises an aggregation DSP unit 911, a DAC 912, a first PA 913, a DML 914, an SSMF 2130 with a length of about 20 km, a variable optical attenuator (VOA) 940, an avalanche photodiode (APD) 954, a second PA 953, an ADC 952, and a deaggregation DSP unit 951. The DAC 912 is similar to the high-speed DACs 653, 663. The ADC 952 is similar to the high-speed ADCs 654, 664. The first PA 913 and the second PA 953 are similar to the PAs 617, 717. The DML 914 is similar to the laser 619. The APD 954 is similar to the PD 418 and 618. The aggregation DSP unit 911 and the deaggregation DSP unit 951 are similar to the BB DSP unit 621.

As an example, the channel aggregation DSP unit 911 generates six LTE-A BB signals, each having five aggregated 20 MHz carriers. The signal BW of each LTE-A signal is 100 MHz, and the sampling rate of the signal is 150 GHz or a multiple of 30.72 MHz. The signal is based on orthogonal frequency-division multiplexing (OFDM) with 64 quadrature amplitude modulation (64-QAM) for subcarrier modulation. The aggregation DSP unit 911 aggregates the BB signals into an aggregated signal by employing similar mechanisms as described for the channel aggregation units 616, 626, 700. For example, the channel maps the BB signals to a plurality of adjacent non-overlapping frequency bands between about 50 MHz to about 2,000 MHz. The DAC 912 is coupled to the aggregation DSP unit 911 and converts the aggregated signal into an analog electrical signal. The first PA 913 is coupled to the DAC 912 and amplifies the analog electrical signal into suitable voltage levels for optical modulation. The DML 914 is coupled to the first PA 913 and modulates the analog electrical signal on to an optical signal via a direction modulation scheme.

The optical signal is transmitted over the SSMF 2130. The VOA 940 is coupled to the SSMF 2130. The VOA 940 is an optical device that attenuates an optical signal with variable attenuations. The SSMF 2130 and the VOA 940 together emulate an optical link, such as the links 530, 630 between the RRU and the BBU.

The APD 954 is coupled to the VOA 940 and converts the optical signal that carries the aggregated signal into an analog electrical signal. The second PA 953 amplifies the analog electrical signal into voltage levels suitable for optical receiver processing. The ADC 952 is coupled to the second PA 953 and converts the analog electrical signal into a digital signal. The deaggregation DSP unit 951 is coupled to the ADC 952 and performs channel deaggregation similar to the channel deaggregation operations in the channel deaggregation units 625, 615, 800 to extract the six BB signals from the received aggregated signal.

One type of channel mapping includes seamless channel mapping. In seamless channel mapping, the frequency spacing between the signals is equal to the sampling rate, which is 150 MHz in this example. The center frequencies of the signals after aggregation are n×150 MHz, where n=1, 2, 3, 4, 5, and 6.

Figure 10B:
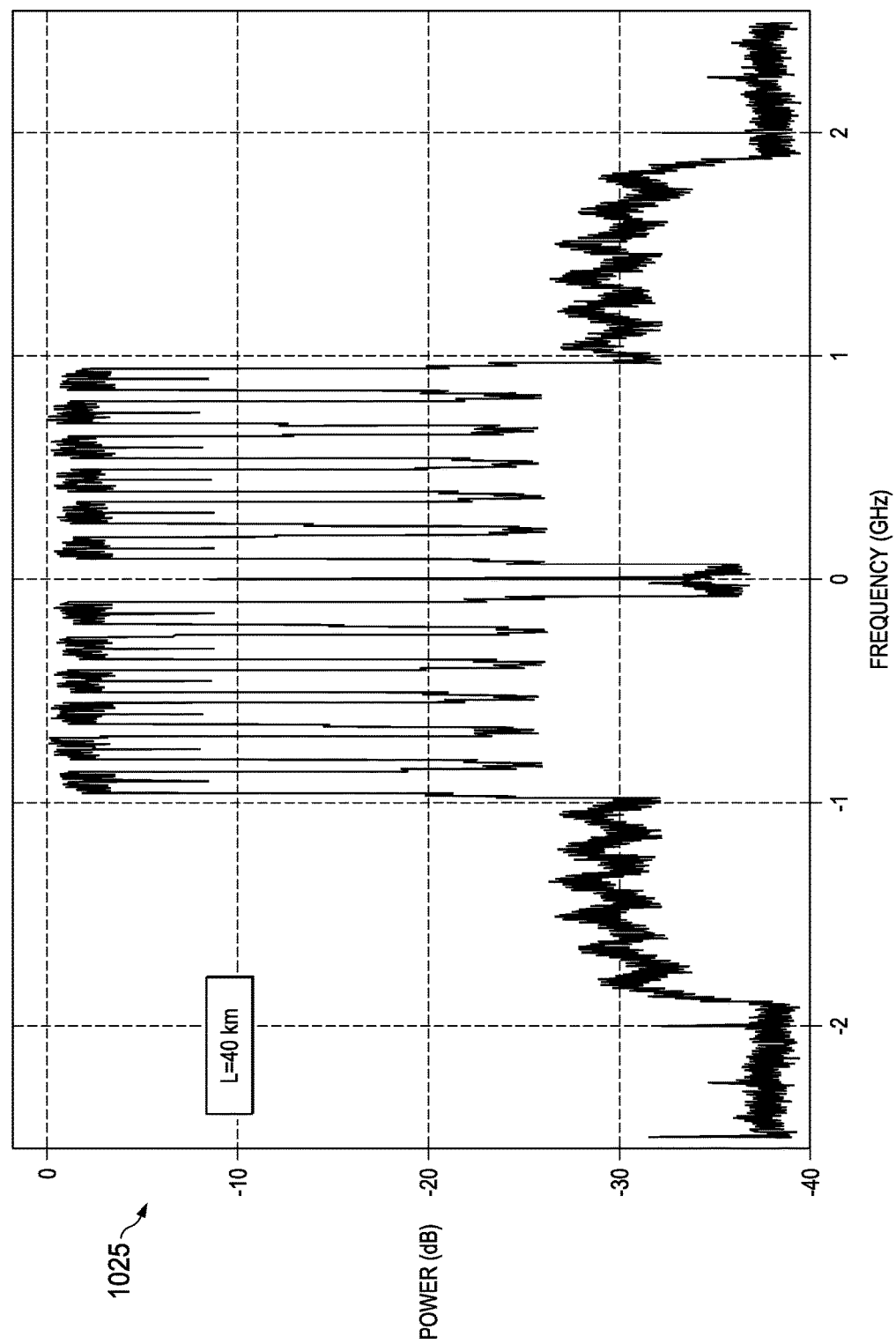
FIG. 10B is a graph illustrating frequency spectra for an aggregated signal measured from the system of FIG. 9 when using seamless channel mapping and a standard single-mode fiber (SSMF) length of 40 km.

FIG. 10A is a graph 1015 illustrating a power spectrum for an aggregated signal measured from the system 900 of FIG. 9 when using seamless channel mapping and a fiber length of 0 km. A 0 km fiber length means that the power spectrum is measured at the fiber input. FIG. 10B is a graph 1025 illustrating a power spectrum for an aggregated signal measured from the system 900 of FIG. 9 when using seamless channel mapping and an SSMF fiber length of 40 km. For both the graph 1015 and the graph 1025, the x-axes represent frequency in GHz, and the y-axes represent power in dB. Compared to the graph 1015, the graph 1025 shows strong subcarrier-to-subcarrier intermixing interference caused by the interplay between dispersion and laser chirp.

Figure 10C:
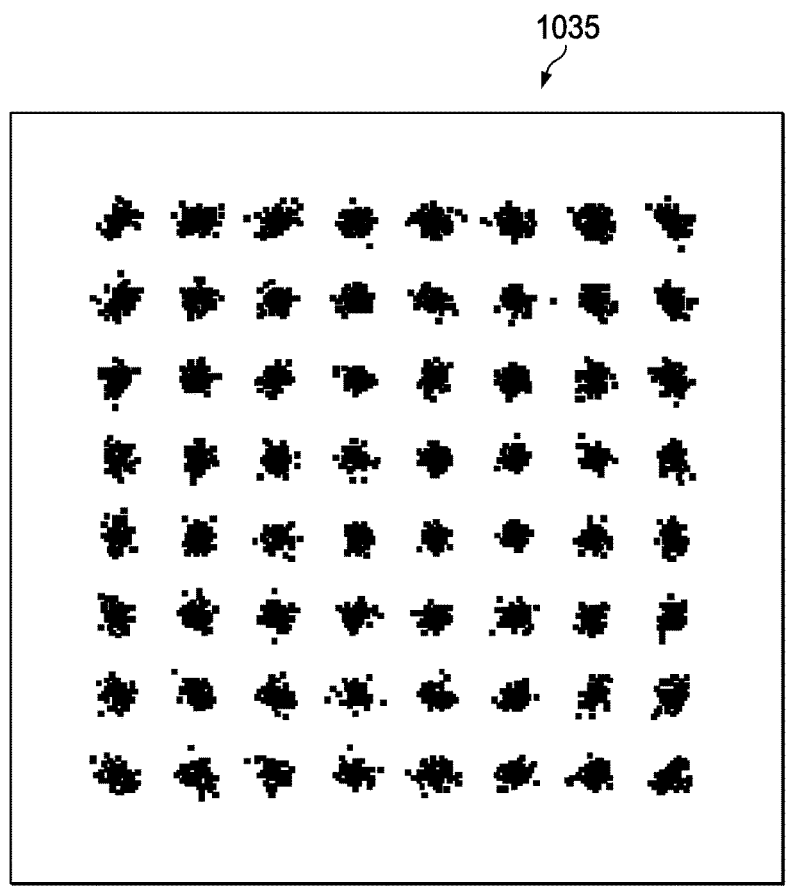
FIG. 10C is a constellation plot of the highest frequency channel in the graph of FIG. 10B.

FIG. 10C is a constellation plot 1035 of the highest frequency channel in the graph 1025 of FIG. 10B. Both the x-axis and the y-axis represent constant units. The constellation plot 1035 shows severe signal constellation distortions with an error vector magnitude (EVM) of about 4.2%.

Figure 11:
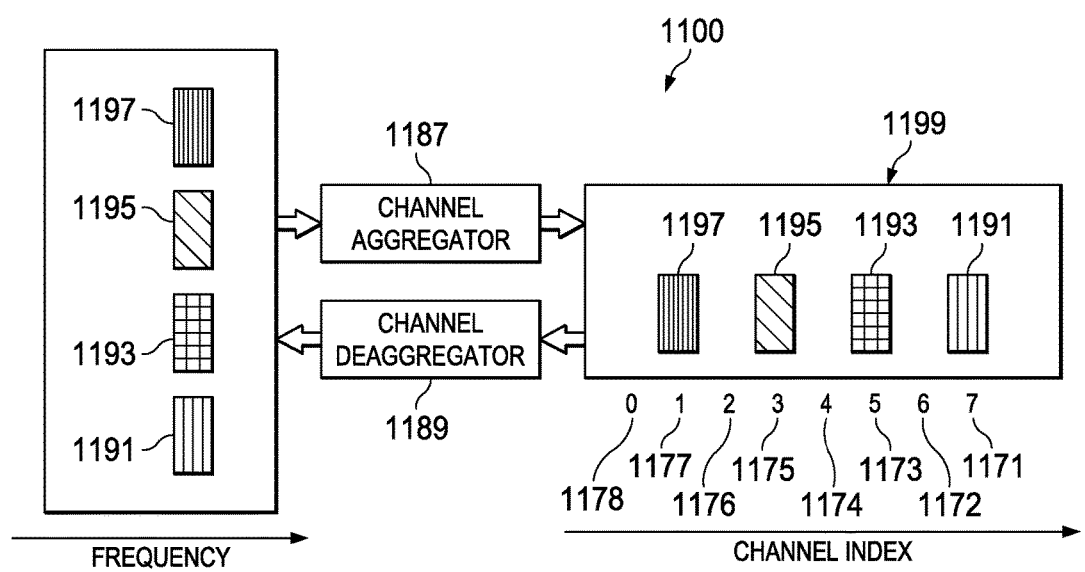
FIG. 11 is an illustration of an odd-only channel mapping scheme according to an embodiment of the disclosure.

FIG. 11 is an illustration of an odd-only channel mapping scheme 1100 according to an embodiment of the disclosure. In the scheme 1100, a channel aggregator 1187 aggregates a plurality of signals 1191, 1193, 1195, 1197 into an aggregated signal 1199 by employing FDM schemes in a manner similar to, for example, the digital channel aggregation unit 616. Each of the signals 1191-1197 has an oversampling ratio (OSR) of about 1.5. The aggregated signal 1199 may be similar to the aggregated UL and the aggregated DL signal transported over the links 530, 630. Each of the signals 1191-1197 may have the same bandwidth for MIMO. Conversely, a channel deaggregator 1189 deaggregates the aggregated signal 1199 into the signals 1191-1197 by employing frequency demultiplexing and shifting mechanisms in a manner similar to, for example, the digital channel deaggregator 615. The signals 1191-1197 may be similar to the RF signals received and transmitted over the antennas 642.

Though each of eight channels 1171, 1172, 1173, 1174, 1175, 1176, 1177, 1178 is available, the scheme 1100 populates only the odd channels 1171, 1173, 1175, 1177 with the signals 1191-1197. The even channels 1172, 1174, 1176, 1178 remain unused. Only the odd channels 1171, 1173, 1175, 1177 are populated because DML-chirped induced dispersion penalty primarily results in second-order mixing products of the original OFDM subcarriers. Those mixing products are at frequencies different from the original OFDM subcarriers and thus will not cause an interference penalty, but will lead to an improved quality of the recovered OFDM-64QAM constellation.

Figure 12A:
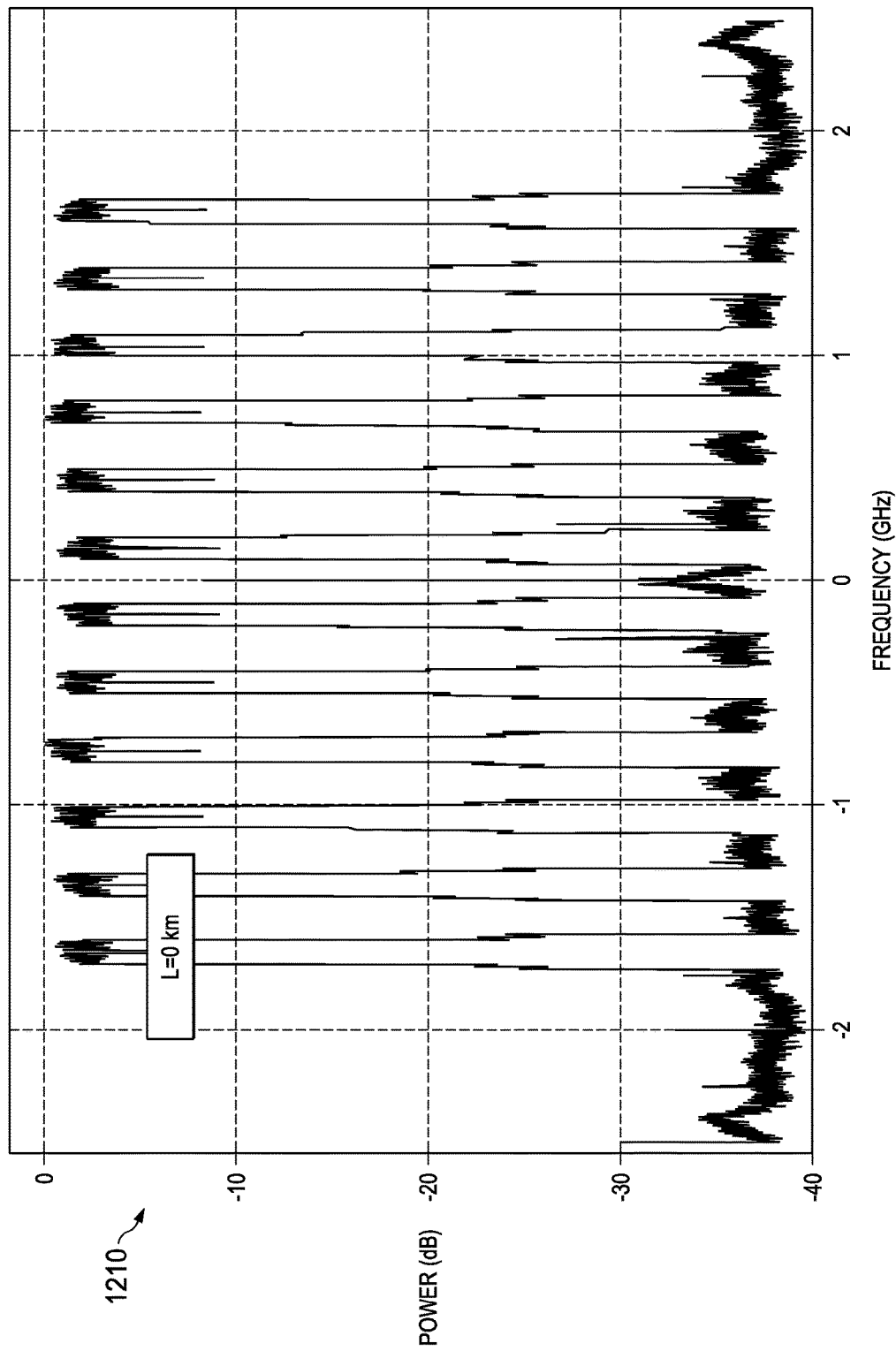
FIG. 12A is a graph illustrating frequency spectra for an aggregated signal measured from the system of FIG. 9 when using odd-only channel mapping and a fiber length of 0 km.
Figure 12B:
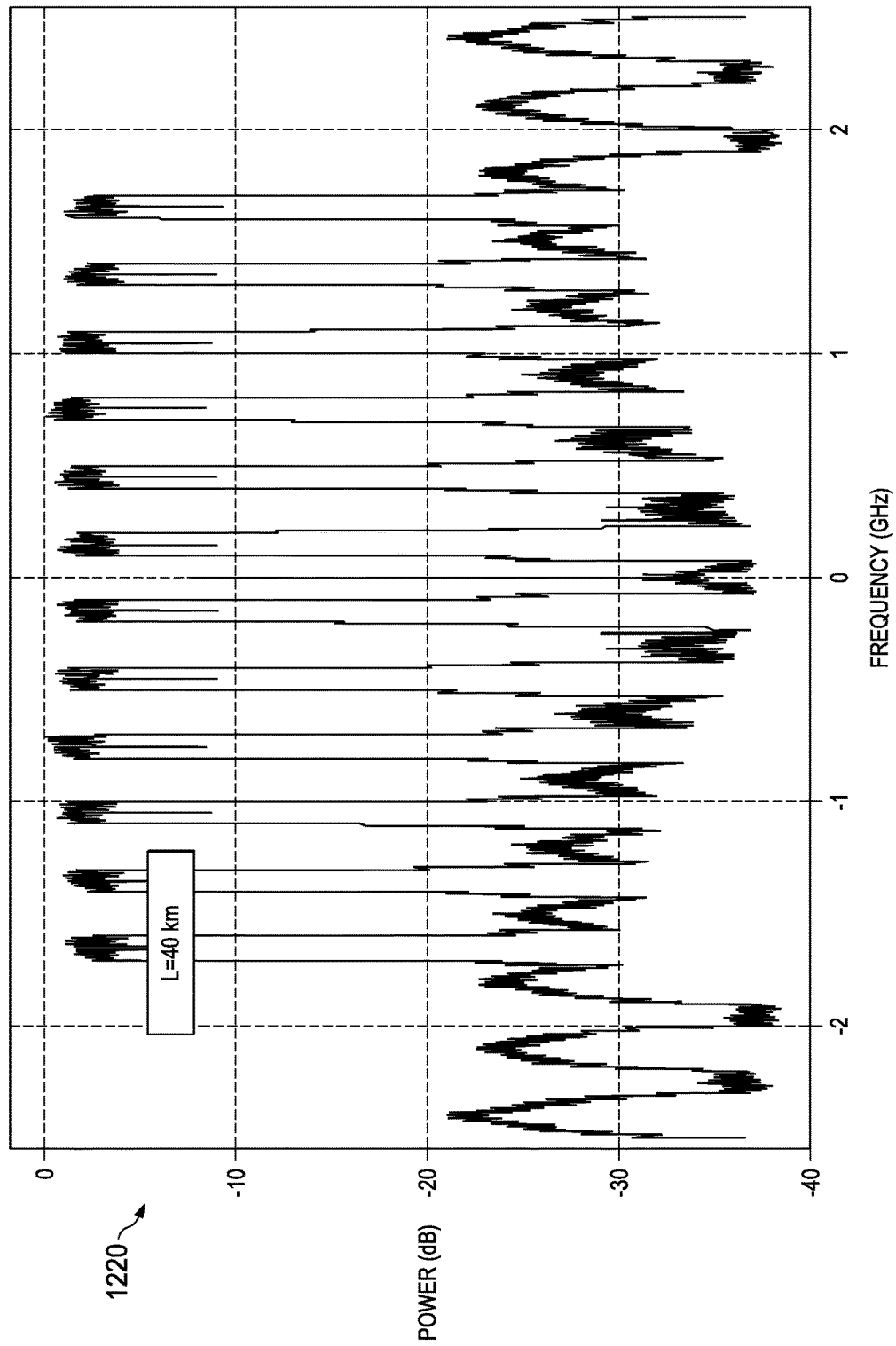
FIG. 12B is a graph illustrating frequency spectra for an aggregated signal measured from the system of FIG. 9 when using odd-only channel mapping and an SSMF length of 40 km.
Figure 12C:
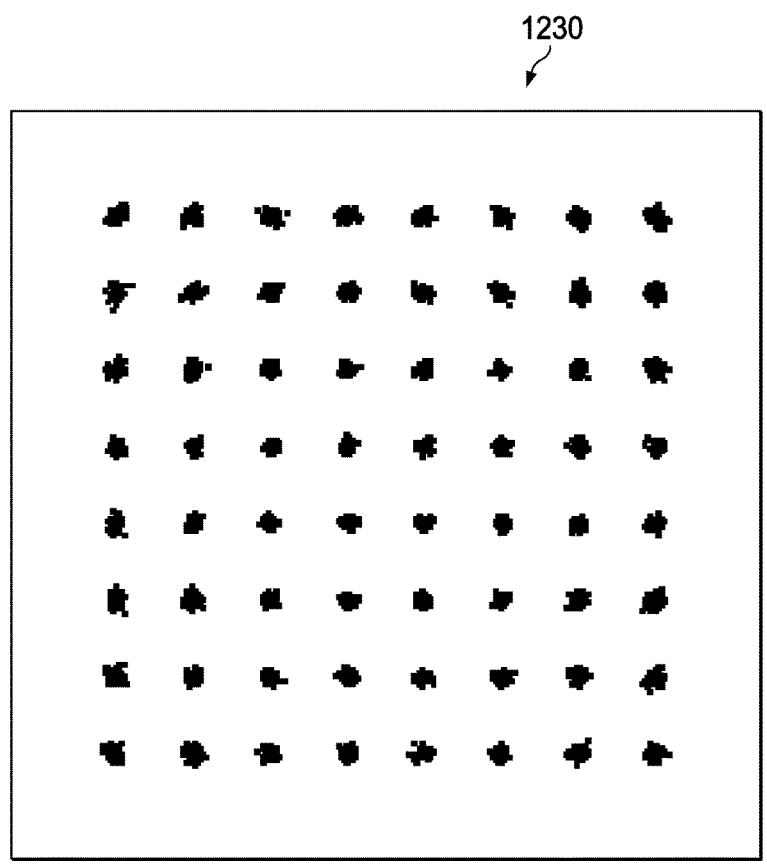
FIG. 12C is a constellation plot of the highest frequency channel in the graph of FIG. 12B.

FIGS. 12A-12C are examples of measured performance of the scheme 1100. The center frequencies of the signals after aggregation are n×150 MHz, wherein n=1, 3, 5, 7, 9, and 11. The frequency 150 MHz is exemplary and could also be another suitable frequency.

FIG. 12A is a graph 1210 illustrating a power spectrum for an aggregated signal measured from the system 900 of FIG. 9 when using odd-only channel mapping and a fiber length of 0 km. FIG. 12B is a graph 1220 illustrating a power spectrum for an aggregated signal measured from the system 900 of FIG. 9 when using odd-only channel mapping and an SSMF length of 40 km. For both the graph 1210 and the graph 1220, the x-axis represents frequency in GHz, and the y-axis represents power in dB. In comparison to the graphs 1015, 1025, both the graph 1210 and the graph 1220 show a smaller interference penalty.

FIG. 12C is a constellation plot 1230 of the highest frequency channel in the graph 1220 of FIG. 12B. Both the x-axis and the y-axis represent constant units. The constellation plot 1230 shows an EVM of about 2%. In comparison to the constellation plot 1030, the 2% EVM indicates less signal constellation distortion.

Figure 13:
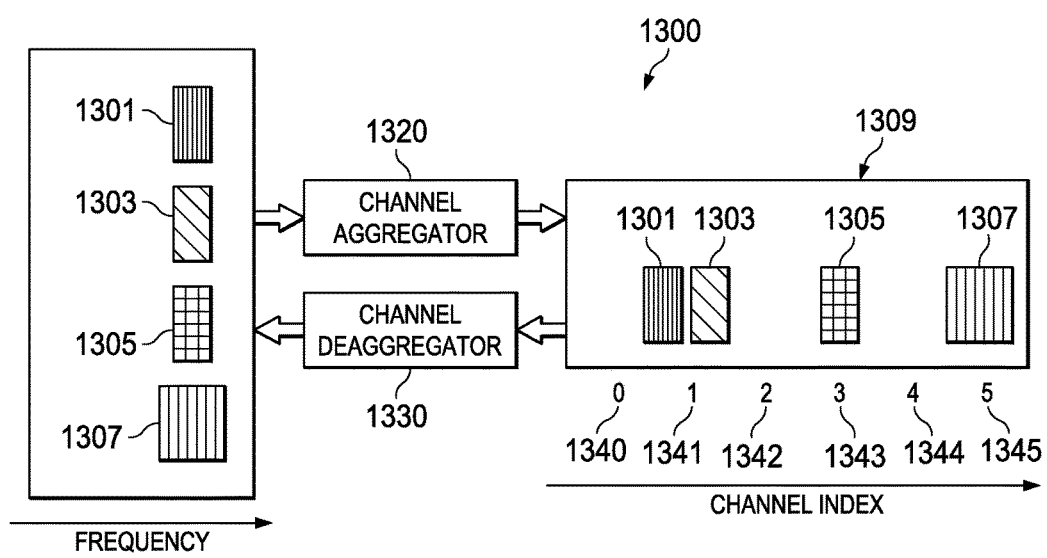
FIG. 13 is an illustration of another odd-only channel mapping scheme according to an embodiment of the disclosure.

FIG. 13 is an illustration of another odd-only channel mapping scheme 1300 according to an embodiment of the disclosure. In the scheme 1300, a channel aggregator 1320 aggregates a plurality of signals 1301, 1303, 1305, 1307 into an aggregated signal 1309 by employing FDM schemes in a manner similar to, for example, the digital channel aggregation unit 616. Each of the signals 1301-1307 has an OSR of about 1.5. The aggregated signal 1309 may be similar to the aggregated UL and the aggregated DL signal transported over the links 530, 630. Unlike for the scheme 1100, the signals 1301-1307 have different bandwidths. Specifically, the signals 1301, 1303, 1305 have smaller bandwidths than the signal 1307. Conversely, a channel deaggregator 1330 deaggregates the aggregated signal 1309 into the signals 1301-1307 by employing frequency demultiplexing and shifting mechanisms in a manner similar to, for example, the digital channel deaggregator 615. The signals 1301-1307 may be similar to the RF signals received and transmitted over the antennas 642.

Though each of six channels 1340, 1341, 1342, 1343, 1344, 1345 is available, the scheme 1300 populates only the odd channels 1341, 1343, 1345 with the signals 1301-1307. The even channels 1340, 1342, 1344 remain unused. Furthermore, the bandwidth for each of the channels 1340-1345 is selected so that it is equivalent to the sampling rate (SR) of the broadest signal, which is the signal 1307 in this case. As a result, some of the channels 1341, 1343, 1345 are broader than the signals 1301-1307 and can accommodate multiple signals 1301-1307. Thus, the channel 1341 is populated with both the signal 1301 and the signal 1303.

Figure 14:
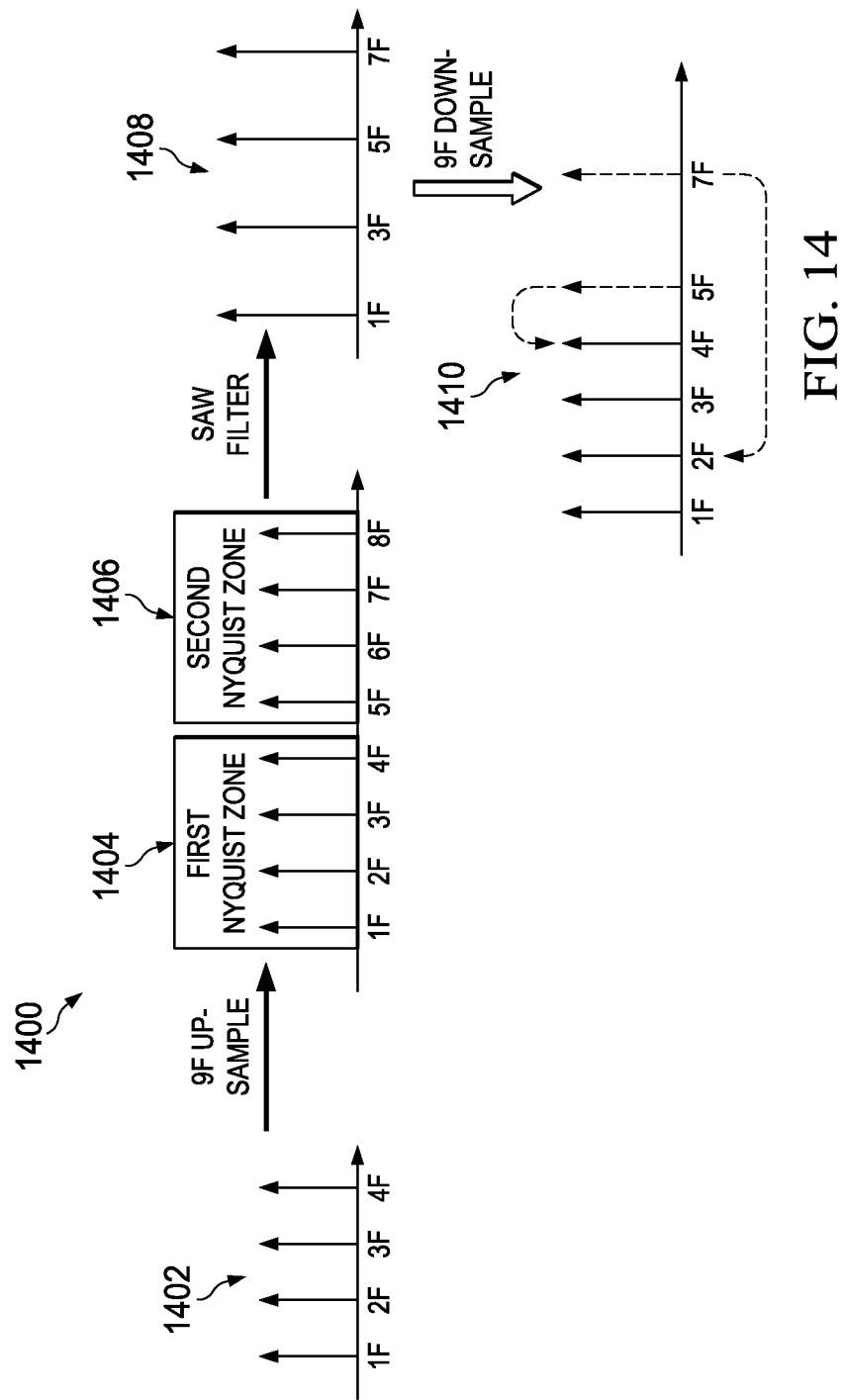
FIG. 14 is an illustration of an undersampling scheme used in conjunction with odd-only channel mapping according to an embodiment of the disclosure.

FIG. 14 is an illustration of an undersampling scheme 1400 used in conjunction with odd-only channel mapping according to an embodiment of the disclosure. Undersampling may be used to reduce the sampling speed requirements of an ADC, for instance the ADC 654 in the RRU 610 and the ADC 664 in the BBU 620. A subcarrier spectrum 1402 comprises four subcarriers, 1F, 2F, 3F and 4F, which are centered on multiples of a frequency, F. The subcarriers may be upsampled at a rate 9F to generate a subcarrier spectrum 1404 in the first Nyquist band at frequencies centered on 1F, 2F, 3F and 4F, and a spectrally-inverted subcarrier spectrum 1406 in the second Nyquist band centered at frequencies 5F, 6F, 7F and 8F. The even-multiple subcarriers may be removed by a filter such as a saw-like filter with a periodic amplitude response to provide the odd-only subcarrier spectrum 1408, which comprises subcarriers centered at frequencies 1F, 3F, 5F, and 7F. If the spectrum 1408 is down-sampled at a sampling rate of 9F, which is less than the Nyquist frequency of the spectrum 1408, then the resulting spectrum 1410, as described further below, comprises bands centered on the frequencies 1F, 2F (alias of the 7F band and shown by the dashed arrow), 3F, and 4F (alias of 5F band), which are the original signals at 1F, 2F, 3F, and 4F.

Figure 15:
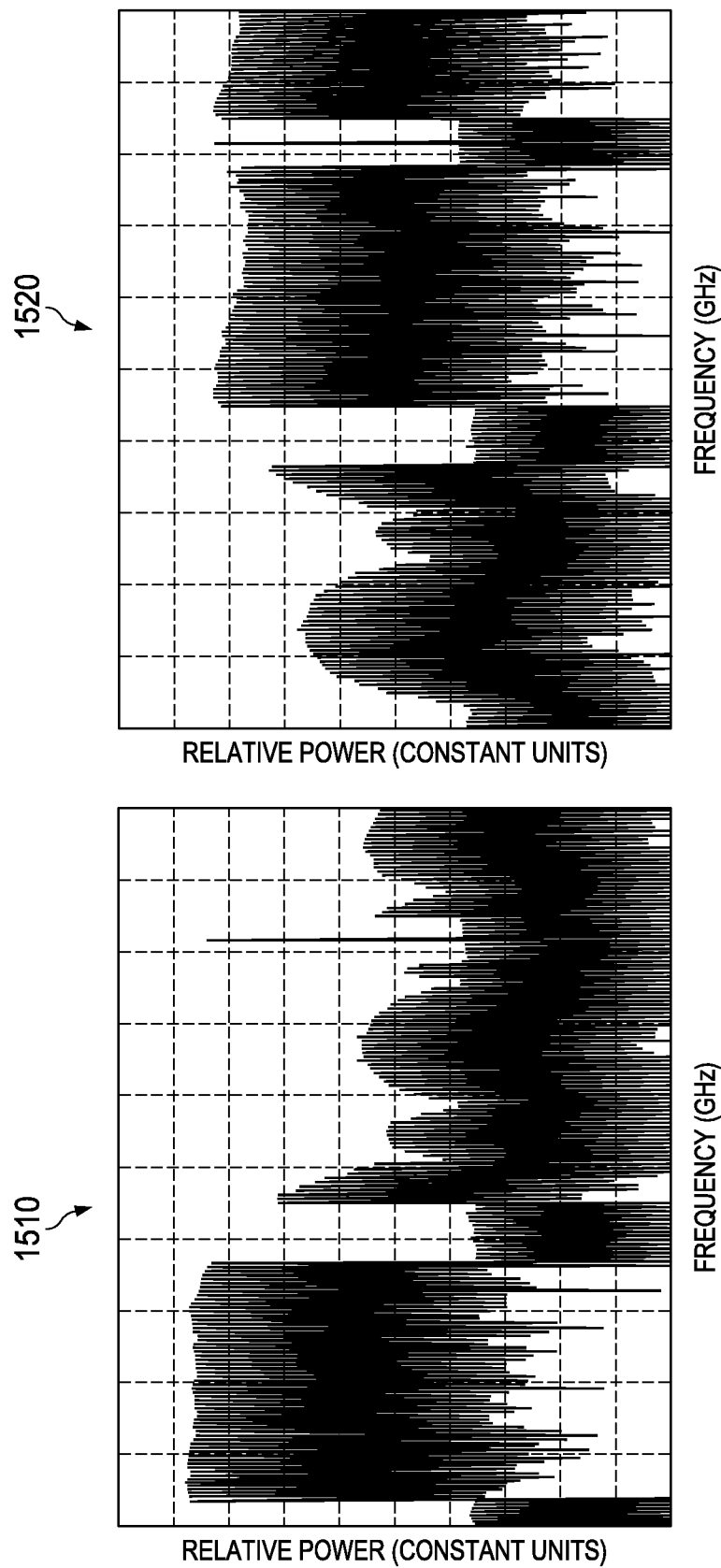
FIG. 15 is a graph of the power spectra of the subcarrier spectrum in the first Nyquist band and a graph of the power spectra of the spectrally-inverted subcarrier spectrum in the second Nyquist band in FIG. 14.

FIG. 15 is a graph 1510 of the power spectra of the subcarrier spectrum 1404 in the first Nyquist band and a graph 1520 of the power spectra of the spectrally-inverted subcarrier spectrum 1406 in the second Nyquist band in FIG. 14. For both the graph 1510 and the graph 1520, the x-axes represents frequency in GHz, and the y-axes represents relative power in constant units. In the graph 1510, the first Nyquist zone spans the frequency range from about 0.1 GHz to 1.1 GHz. In the graph 1520, the second Nyquist zone spans the frequency range from about 1.4 GHz to about 2.4 GHz. Both the graph 1510 and the graph 1520 show that, despite the undersampling scheme 1400, the desired Nyquist zone power can be maintained in both the first and the second Nyquist zones.

Based on the Nyquist-Shannon sampling theorem, if a function x(t) contains no frequencies higher than B cycles per second (cps), it is determined by giving its ordinates at a series of points spaced 1/(2B) seconds apart. For the case with four frequency bands centered at F, 3F, 5F, and 7F with a bandwidth of F, the highest frequency is 7.5F, so the Nyquist-Shannon sampling theorem requires a sampling rate of 15F in order to avoid inter-symbol interference (ISI). However, the example above uses a sampling rate of 9F, which converts the original frequency bands as follows:

$F \rightarrow F$ $3F \rightarrow 3F$ $5F \rightarrow$ alias: $9F-5F=4F$ $7F \rightarrow$ alias: $9F-7F=2F$ As shown, the four bands are spectrally compressed by about two times, thus nearly doubling the sampling efficiency. The aliases centered at 2F and 4F are spectrally-inverted copies of 7F and 5F, respectively. If the odd subcarriers are generated by an oversampling DAC in the first Nyquist band as shown in FIG. 14, then they subsequently need to be spectrally inverted back to recover the original signals. Using an odd-only channel mapping scheme such as the scheme 1100 or 1300, the ADC SR follows the following rule:

$$SR = \Delta f \cdot (N_{max} + 2) \quad (6)$$

where $\Delta f$ is the channel spacing (or the channel slot width) or F in the example above and $N_{max}$ is the channel index of the highest-frequency odd channel.

Figure 16:
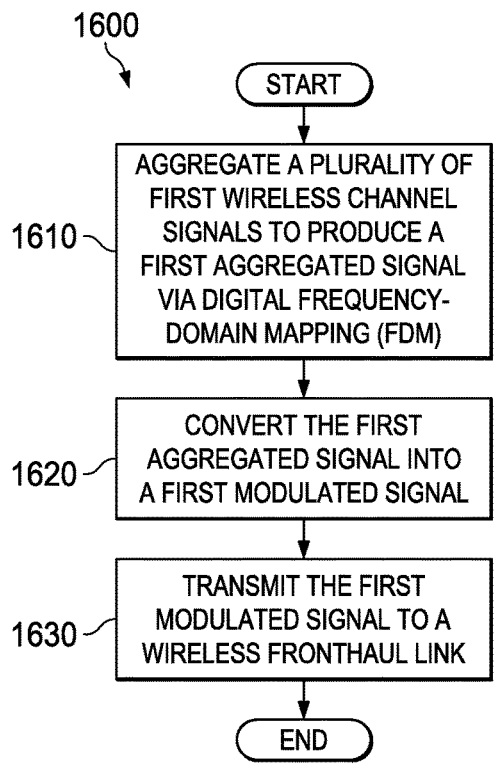
FIG. 16 is a flowchart illustrating a method of aggregating channels according to an embodiment of the disclosure.

FIG. 16 is a flowchart illustrating a method 1600 of aggregating channels according to an embodiment of the disclosure. The method 1600 may be implemented by an RRU such as the RRUs 510, 610 and a BBU such as the BBUs 521, 620. At step 1610, a plurality of first wireless channel signals is aggregated to produce a first aggregated signal via digital FDM. The first wireless channel signals are positioned in the first aggregated signal in non-overlapping first frequency bands. Each non-overlapping first frequency band has a first bandwidth and a center frequency. Each respective center frequency is an odd integer multiple of a lowest center frequency. The channel aggregation may be performed in a digital domain by employing similar FFT- and IFFT-based mechanisms as described in conjunction with FIG. 18 below. Alternatively, the channel aggregation may be performed in an analog domain by employing similar mechanisms as described in Liu. At step 1620, the first aggregated signal is converted into a first modulated signal. At step 1630, the first modulated signal is transmitted to a wireless fronthaul link. For example, when the wireless fronthaul link is a wireless fronthaul optical link such as the links 530, 630, then the first modulated signal is an optical signal generated by modulating the aggregated signal onto an optical carrier. Alternatively, the wireless fronthaul link may be a cable link or a free-space microwave link, so different types of signal conversions, modulations, and transmissions may be performed at steps 1620 and 1630.

Figure 17:
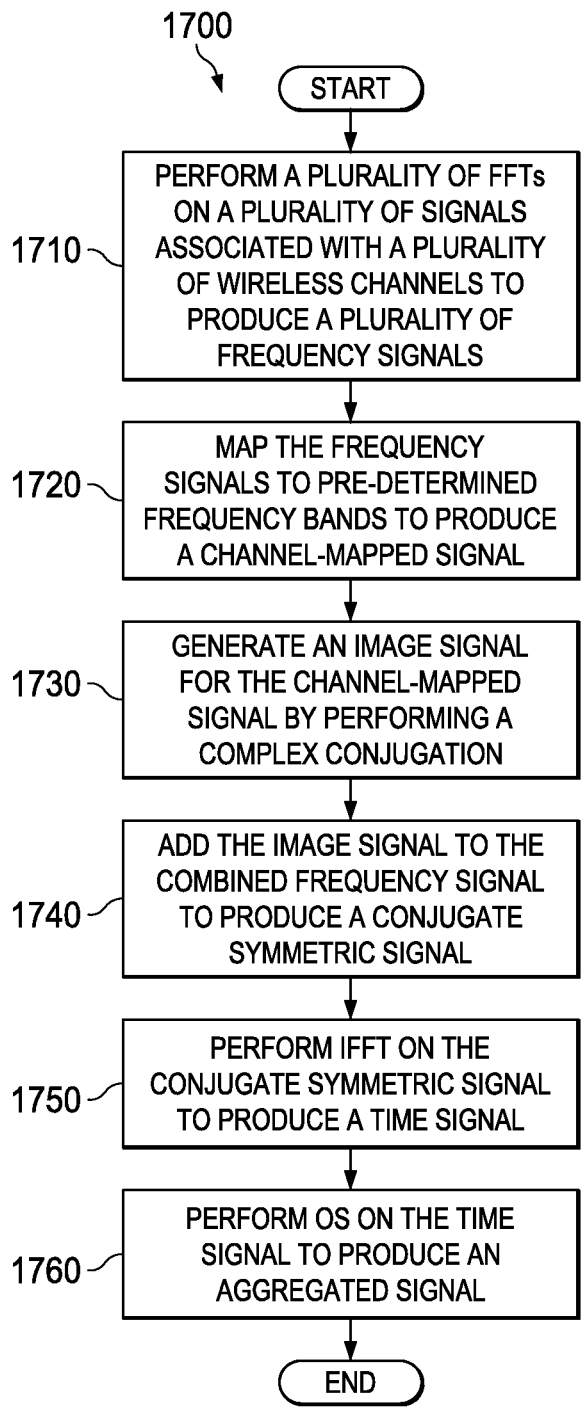
FIG. 17 is a flowchart illustrating a method of aggregating channels according to another embodiment of the disclosure.

FIG. 17 is a flowchart illustrating a method 1700 of aggregating channels according to another embodiment of the disclosure. The method 1700 may be implemented by an RRU such as the RRUs 510, 610 and a BBU such as the BBUs 521, 620. At step 1710, a plurality of FFTs is performed on a plurality of signals associated with a plurality of wireless channels to produce a plurality of frequency signals. For example, at an RRU, the signals are UL RF signals received from antennas such as the antennas 542, 642 and may be frequency downconverted to an IF band to simplify implementation. At a BBU, the signals are DL BB signals destined for the wireless channels. It should be noted that the sizes for the different FFTs may vary depending on the BWs of the wireless channels as described above.

At step 1720, the frequency signals are mapped to predetermined frequency bands to produce a channel-mapped signal. The channel-mapped signals comprise non-overlapping frequency bands having respective center frequencies that are odd-integer multiples of a lowest center frequency which has an odd-integer multiple of 1. At step 1730, an image signal is generated for the channel-mapped signal by performing a complex conjugation. For example, the image signal is a spectral mirror image of the channel-mapped signal folded at the direct current. At step 1740, the image signal is added to the combined frequency signal to produce a conjugate symmetric signal.

At step 1750, an IFFT is performed on the conjugate symmetric signal to produce a time signal. For example, the IFFT size is larger than each of the FFT sizes and operates at a high ASR, where the IFFT size, the FFT sizes, and the ASR are selected such that the sampling rate of each wireless channel signal corresponds to an integer number of IFFT points. At step 1760, an OS is performed on the time signal to produce an aggregated signal. The wireless channel signals are carried in non-overlapping frequency bands with center frequencies that are an odd-integer multiple of a lowest center frequency in the aggregated signal. The OS may be performed by extracting samples at about the center of the time signal instead of at the beginning of the time signal. For example, when the IFFT size is M and the overlap length of the OS is L, the number of samples to be extracted may be about M-L. The generation of the conjugate symmetric signal at steps 1730 and 1740 allows the time signal to be a real-valued signal such that an optical modulation scheme such as an IM scheme may be employed for optical transmission. The steps 1730 and 1740 may be optional for other optical modulation schemes.

Figure 18:
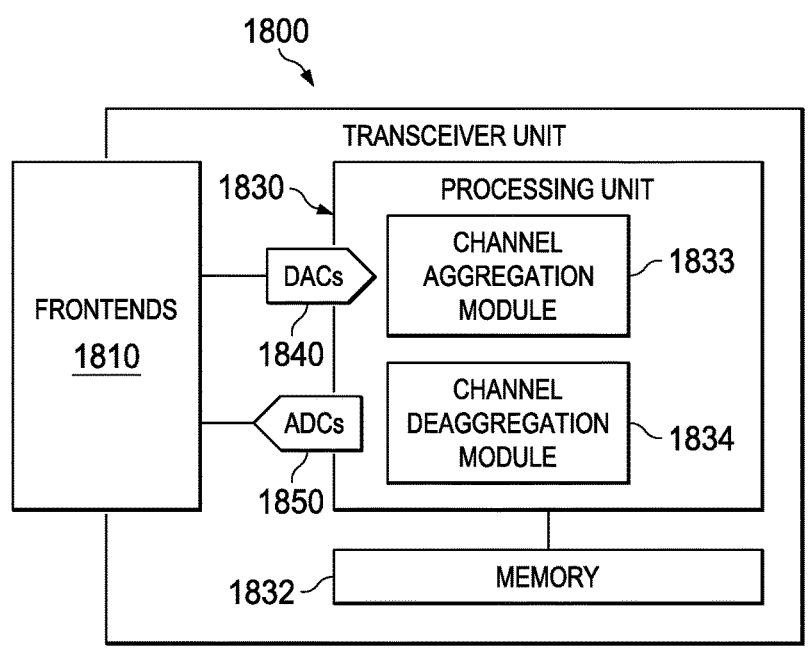
FIG. 18 is a schematic diagram of an embodiment of a wireless fronthaul transceiver unit.

FIG. 18 is a schematic diagram of an embodiment of a wireless fronthaul transceiver unit 1800, which may be any device that transmits or receives optical signals or RF signals. For example, the transceiver unit 1800 may be located in an optical communication device such as the RRUs 510, 610 or the BBUs 520, 620 in a wireless fronthaul communication system such as the wireless fronthaul communication systems 500, 600. The transceiver unit 1800 may also implement or support any of the described schemes. One skilled in the art will recognize that the term "transceiver unit" encompasses a broad range of devices of which transceiver unit 1800 is merely an example. Transceiver unit 1800 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 1800. For instance, the features and methods in the disclosure may be implemented using hardware, firmware, and/or software installed to run on hardware. As shown in FIG. 18, the transceiver unit 1800 may comprise a plurality of frontends 1810. The frontends 1810 may comprise an optical frontend and/or a RF frontend. For example, an optical frontend may be similar to the optical frontend 655 and 665 and may comprise E/O components and/or O/E components, which may convert an electrical signal to an optical signal for transmission in a wireless fronthaul optical network and/or receive an optical signal from the wireless fronthaul network and convert the optical signal to an electrical signal, respectively. The RF frontend may comprise RF components, RF devices, and/or RF interfaces, such as the RRHI 511, which may receive and transmit wireless RF signals. A processing unit 1830 may be coupled to the frontends 1810 via a plurality of DACs 1840 and ADCs 1850. For example, the DACs 1840 may be similar to the DACs 413 and 613, and/or the high-speed DACs 653 and/or 663. The ADCs 1850 may be similar to the ADCs 414 and 614, and/or the high-speed ADCs 654 and/or 664. The DACs 1840 may convert digital electrical signals generated by the processing unit 1830 into analog electrical signals that may be fed into the frontend 1810. The ADCs 1850 may convert analog electrical signals received from the frontends 1810 into digital electrical signals that may be processed by the processing unit 1830. In some embodiments, the ADCs 1850 and the DACs 1840 may be integrated with the processing unit 1830. The processing unit 1830 may comprise one or more processors, which may include general processors, single-core processors, multi-core processors, application specific integrated circuits (ASICs), and/or DSPs. The processing unit 1830 may comprise a channel aggregation module 1833 and a channel deaggregation module 1834, which may implement the described schemes. In an alternative embodiment, the channel aggregation module 1833 and the channel deaggregation module 1834 may be implemented as instructions stored in the memory module 1832, which may be executed by the processing unit 1830. The memory module 1832 may comprise a cache for temporarily storing content, e.g., a random-access memory (RAM). Additionally, the memory module 1832 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the transceiver unit 1800, at least one of the processing unit 1830 and/or memory module 1832 are changed, transforming the transceiver unit 1800 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a wireless fronthaul unit, the method comprising:
aggregating a plurality of first wireless channel signals to produce a first aggregated signal via digital frequency-domain mapping (FDM), wherein the first wireless channel signals are positioned in the first aggregated signal in non-overlapping first frequency bands, each non-overlapping first frequency band having a first bandwidth and a center frequency, wherein each respective center frequency is an odd-integer multiple of a lowest center frequency;
converting the first aggregated signal into a first modulated signal; and
transmitting the first modulated signal to a wireless fronthaul link.

2. The method of claim 1, wherein the first bandwidth is a sampling rate (SR) of a wireless signal with a largest bandwidth.

3. The method of claim 2, wherein the SR is a multiple of 30.72 megahertz (MHz).

4. The method of claim 1, further comprising undersampling the first aggregated signal.

5. The method of claim 4, further comprising sampling, by a digital-to-analog converter (DAC), the first aggregated signal at a sampling rate that is ($N_{max}$+2) times the first bandwidth, where $N_{max}$ is a channel index of a highest center frequency odd channel.

6. The method of claim 1, wherein the odd-integer multiple of the center frequency of a lowest first frequency band has a value of 1.

7. The method of claim 4, further comprising receiving, by a deaggregation unit, the first aggregated signal, wherein the wireless fronthaul unit comprises the deaggregation unit.

8. The method of claim 7, further comprising deaggregating, by the deaggregation unit, the first aggregated signal into a plurality of baseband signals.

9. The method of claim 1, further comprising generating the first frequency bands by:
upsampling a set of second frequency bands; and
filtering the set of second frequency bands to remove each of the second frequency bands having a center frequency that is an even integer multiple of the lowest center frequency.

10. The method of claim 1, wherein the wireless fronthaul unit is a baseband unit (BBU), wherein the first wireless channel signals comprise wireless downlink (DL) channel signals, and wherein the method further comprises generating the first wireless channel signals in a baseband (BB).

11. The method of claim 1, wherein the first modulated signal comprises one of an optical signal, a cable signal, or a free-space microwave signal.

12. The method of claim 1, further comprising generating the first modulated signal with a directly-modulated laser (DML).

13. The method of claim 12, wherein the first modulated signal incurs clipping of a signal amplitude in the DML.

14. The method of claim 13, wherein the clipping is asymmetric.

15. A wireless fronthaul unit comprising:
an optical frontend configured to receive wireless uplink signals; and
a channel aggregation unit coupled to the optical frontend and configured to aggregate the wireless uplink signals via digital frequency-domain mapping (FDM) to produce an aggregated signal,
wherein the wireless uplink signals are positioned in the aggregated signal in frequency bands,
wherein each frequency band has a first bandwidth and a center frequency, and
wherein each center frequency is an odd integer multiple of a lowest center frequency.

16. The wireless fronthaul unit of claim 15, wherein the first bandwidth is a sampling rate (SR) of a wireless signal with a largest bandwidth.

17. The wireless fronthaul unit of claim 15, wherein the channel aggregation unit is further configured to undersample the aggregated signal.

18. The wireless fronthaul unit of claim 17, further comprising a digital-to-analog converter (DAC) configured to sample the aggregated signal at a rate that is ($N_{max}$+2) times the first bandwidth, where $N_{max}$ is a channel index of a highest-frequency odd channel.

19. The wireless fronthaul unit of claim 15, wherein the wireless fronthaul unit further comprises a deaggregation unit.

* * * * *